US006182056B1

(12) United States Patent
St. Jacques et al.

(10) Patent No.: US 6,182,056 B1
(45) Date of Patent: *Jan. 30, 2001

(54) METHOD OF MODELING COMPLEX NAVIGATIONAL LOGIC IN A CLIENT/SERVER ENVIRONMENT

(75) Inventors: Michael G. St. Jacques, Tampa; Delano C. Stevens, Weston, both of FL (US)

(73) Assignee: GTE Data Services Incorporated, Irving, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/203,309

(22) Filed: Dec. 1, 1998

Related U.S. Application Data

(63) Continuation-in-part of application No. 08/445,605, filed on May 22, 1995, now Pat. No. 5,870,727.

(51) Int. Cl.[7] .................................................. G06F 15/18
(52) U.S. Cl. ...................................................................... 706/11
(58) Field of Search .................................. 345/357, 326; 707/104; 706/11

(56) References Cited

U.S. PATENT DOCUMENTS

| | | | |
|---|---|---|---|
| 4,775,935 | 10/1988 | Yourick | 345/357 |
| 5,103,498 | 4/1992 | Lanier et al. | 706/11 |
| 5,228,137 | 7/1993 | Kleinerman et al. | 395/500 |
| 5,247,614 | 9/1993 | Eagen et al. | 395/200.33 |
| 5,289,535 | 2/1994 | Bogart et al. | 379/201 |
| 5,404,506 | * 4/1995 | Fujisawa et al. | 707/4 |
| 5,432,940 | 7/1995 | Potts et al. | 395/682 |
| 5,485,544 | 1/1996 | Nonaka et al. | 706/11 |
| 5,500,934 | 3/1996 | Austin et al. | 345/326 |
| 5,509,116 | 4/1996 | Hiraga et al. | 707/1 |

(List continued on next page.)

OTHER PUBLICATIONS

M. St. Jacques, D. Stevens, J. Getchius, L. Lau, "A Knowledge–Based Method for Engineering Navigational Capability into User Interface Software", Fourth International Conference on Software Engineering and Knowledge Engineering, Jun. 1992.*

T. Negrino and D. Smith, JavaScript for the World Wide Web, 2nd Edition, pp. 73–87, Dec. 1997.*

T. Fukuda, et al., "Concept and Realization of Adaptive Interface Based on User's Skill and Uncomfortableness," Proc. IEEE Int'l. Workshop on Robot and Human Communication, pp. 171–176 (Sep. 1992).

* cited by examiner

Primary Examiner—Tariq R. Hafiz
Assistant Examiner—Michael Pender
(74) Attorney, Agent, or Firm—Leonard Charles Suchyta; Floyd E. Anderson

(57) ABSTRACT

A method for modeling complex navigational logic that automatically controls the presentation of screen displays at the user interface of a client in a client/server environment utilizes a Navigation Analysis Vehicle "NAV") (or module) and a Matrix Analysis Package ("MAP"). The MAP facilitates creation of navigation rules for linkage with the rest of the application. In a preferred embodiment of the invention, the NAV communicates navigational instructions to a user interface for the display and take-down of screens, and also communicates with other processes such as editors and data manipulators. After the navigation rules are created, those rules are then applied to provide navigational logic for the user interface for the processing of the user interface screens. MAP creates the navigation rules in a user-friendly, C-like language and parses them into ANSI-standard C language for linkage with other processes that control the user interface.

2 Claims, 13 Drawing Sheets

U.S. PATENT DOCUMENTS

| | | | |
|---|---|---|---|
| 5,539,872 | 7/1996 | Mintz et al. | 345/326 |
| 5,546,583 | 8/1996 | Shriver | 395/680 |
| 5,717,835 * | 2/1998 | Hellerstein | 706/46 |
| 5,720,007 * | 2/1998 | Hekmatpour | 706/50 |
| 5,761,673 * | 6/1998 | Bookman et al. | 707/104 |
| 5,799,292 * | 8/1998 | Hekmatpour | 706/11 |
| 5,805,775 * | 9/1998 | Eberman et al. | 706/11 |
| 5,845,270 * | 12/1998 | Schatz et al. | 706/11 |
| 5,854,923 * | 12/1998 | Dockter et al. | 707/5 |
| 5,895,459 * | 4/1999 | Enomoto | 706/10 |

# METHOD OF MODELING COMPLEX NAVIGATIONAL LOGIC IN A CLIENT/SERVER ENVIRONMENT

RELATED APPLICATION

The present invention is a continuation-in-part application of U.S. patent application Ser. No. 08/445,605, entitled "A Rule-Based System for the Provision of Complex Navigational Logic." by Michael S. Jacques and Dealno Stevens, filed on May 22, 1995, now U.S. Pat. No. 5,870,787, and assigned to the assignee of the present invention, and which is incorporated by reference as if fully set forth herein.

COPYRIGHTS

A portion of the disclosure of this patent contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates generally to the management of information. More particularly, the invention relates to a method for automatically controlling the presentation of screen displays at the user interface of a client in a client/server environment.

BACKGROUND OF THE INVENTION

Significant advances in presentation technologies have occurred in recent years. Workstations with sophisticated user interfaces—long the sole domain of engineers and scientists—now are finding application in the broader marketplace.

New presentation of software and standardization efforts have bolstered this migration to a larger commercial environment. X-Windows software from MIT and its X-Consortium are illustrative of such development. The combination of X-Windows with other standards, such as OSF/Motif. UNIX and C, has allowed application developers a new freedom from many platform issues and has enhanced the efficiency in the creation of user interface (UIs).

In spite of such strides in efficiency and much continuing work in X-Windows, one of the most time consuming tasks in creating working UIs has received little or no attention—the development of software to control the screens a user sees and the sequence with which those screens are presented. Throughout this disclosure, this type of software is referred to as navigational logic.

Currently, the only mechanism provided within X-Windows and many other environments to accomplish navigation is through what are generically referred to as "callback" routines. That mechanism provides a means of linking the processing of a function to an X-Event, such as a button push or the filling in of a field on the screen.

With callback functions it is possible to achieve certain navigational goals. For example, a callback might be executed from a button press in the current screen which unmaps that screen and presents another subsequent screen. The approach has value, but it becomes cumbersome when the navigational logic is more complex than simple screen-to-screen traversal.

1. Client/Server Architecture

Many modern system are based on a three-tier, client/server architecture in which work is distributed over a number of processors. At the first tier, users interface with the system through easy-to-use graphical screens presented on workstations (shown as Group 3 in FIG. 1). Significant savings in user efficiency can be realized with a graphical user interface (OUI) based on the X-Windows System and OSF/Motif standards.

Workstations are linked via Ethernet to servers at tier two which handle some data management tasks and communicate with other systems as shown in FIG. 1 (Group 2 in FIG. 1). Often, workstations and servers run under UNIX and software is generally written in the C programming language. Tier three consists of mainframe computers and timeshare systems which, for example, access corporate data repositories for customer records, service orders and other data.

2. Navigational Complexity in Modern Systems

In more advanced systems, the user is guided through complex transactions by the system. This factor is often critical to cost savings because it allows less experienced people to competently use the system. However, this user-friendly approach complicates the navigational aspects of the system.

The correct screen must appear to the user at the proper time without user intervention. At certain points in the transaction, however, the user must have substantial flexibility in choosing screens. Often, both of these requirements have to be met simultaneously with navigational logic. It is also often unnecessary to control which fields are available to a user or to impact the field-to-field flow.

Transactions often require at least one end, more frequently, two or three asynchronous accesses to tier three computers. During these sometimes lengthy excursions, certain screens are presented or are at least made available to users. This is often done so that the users can take any additional information from the customer which can logically be obtained prior to receiving a return response from the tier three computer. When results do come back, they often influence which screens must appear in the flow and possibly how the transaction must proceed from that point forward. The navigational logic must have the capability to handle these situations.

A second factor contributing to navigational complexity stems from the fact that many modern systems are to be implemented globally at a large number of locations. Each location has its own methods of doing business based on local demographics. Therefore, screen availability and order of presentation have to be controllable by the local user group. Often, to accomplish this, a table is periodically edited. The table is subsequently read by the system at start-up and the screens presented accordingly.

A third factor is the result of recent industry trends toward rapidly creating specialized services and bringing them to market quickly. Of course, part of bringing any service to market includes integrating the service into a company's operational support systems. System integration has traditionally been a slow process, but in recent years the need for faster integration has become much more evident.

For all the above-stated considerations, there is a need for a method which can accommodate more complex navigation and is more sophisticated than the use of callback functions provided by X-Windows. The new method for creating navigational logic must be efficient and responsive to transaction requirements, while providing features such as speed of development, maintainability and flexibility.

SUMMARY OF THE INVENTION

Accordingly, an advantage of the present invention is the provision of a rule-based method for managing messages between clients, servers or other interfaces, while retaining the complex relationships that affect the order and appropriateness of actions with an application.

Another advantage of an exemplary embodiment of the present invention is the provision of a novel, time-saving approach to creating complex navigational logic.

A further advantage of an exemplary embodiment of the present invention is the provision of a C-like language parser which facilitates the creation of navigational rules.

A still further advantage of an exemplary embodiment of the present invention is the ease of maintaining navigational code because the navigational code is disposed in a centralized location and is isolated from the UI.

Yet another advantage of the present invention is that complex navigational relationships are more easily envisioned, described and implemented.

The above and other advantages of various embodiments of the present invention are carried out in one form by a novel, time-saving technique for providing complex navigational logic, which has been developed as a general method. In this document the general method will be referred to as the Navigational Analysis Vehicle ("NAV") or module. NAV is a rule-based system that illustratively provides navigational logic for UIs in an X-Windows environment. NAV is supported by the Matrix Assembly Package (MAP), a C-like language parser which facilitates the creation of navigational rules.

In an illustrative embodiment of the invention, the invention is directed to a method of modeling complex logical relationships associated with an interaction of a multiplicity of screen displays at a user interface and other processes, comprising the steps of: organizing a matrix data structure comprising a plurality of cells configured in an arrangement of rows and columns; and populating the cells with a set of descriptors defining the interaction of the multiplicity of screen displays with the other processes associated with the navigation at the user interface of the application.

In another illustrative embodiment, the invention is directed to a system for modeling complex logical relationships, comprising: a work station comprising a processor programmed to organize a matrix data structure comprising a plurality of cells configured in an arrangement of rows and columns, and to populate said plurality of cells with a set of descriptors defining the interaction of said multiplicity of screen displays with said other processes associated with the navigation at said user interface of said application, wherein each row and column corresponds to one of a screen or an asynchronous external event, the processor further being programmed to be responsive to a transition between selected screens to generate a corresponding control signal; and an information processing center including a host data server electrically connected to the processor and responsive to receipt of the control signal from the processor to execute a corresponding transaction and to transmit results of the transaction to the work station processor for display in connection with a corresponding screen.

Other advantages and features of the invention will be apparent from the following description of the preferred embodiment thereof and from the claims herein.

BRIEF DESCRIPTION OF THE DRAWINGS

A more complete understanding of the present invention may be derived by referring to the detailed description and claims when considered in connection with the appended FIGURES, wherein like reference numbers refer to similar items throughout the FIGURES, and wherein:

DESCRIPTION OF THE PREFERRED EMBODIMENT

The preferred environment for the present invention is a three-tier, client/server architecture in which work is distributed over a number of processors. At the first tier, users interface with the system through easy-to-use graphical screens (i.e., a graphical user interface or "GUI") presented on workstations 10 that are well known to those skilled in the art (Group 3). Typically, workstation hardware includes a display capable of simultaneously presenting multiple graphical user interface ("GUI") screens "X" and includes a processor and memory for utilizing this invention. The GUI screens are based on the X-Windows System and OSF/Motif standards. For this implementation, the MP 9000 server workstations from the Hewlett-Packard Company may be used.

Figure 1:
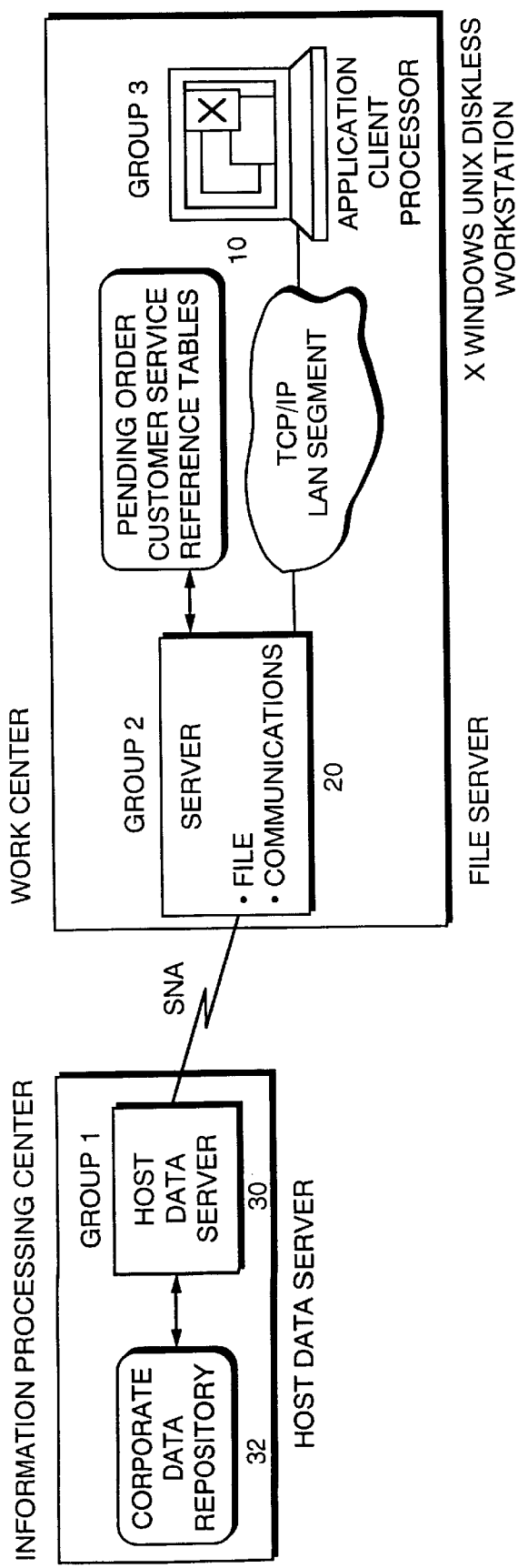
FIG. 1 illustrates a typical configuration including workstations linked with a server, and the server is linked with a mainframe computer and other external hosts.

The diskless workstations are linked via Ethernet to servers 20 at tier (or Group) two which handle some data management tasks and communicate with other system as shown in FIG. 1. For this implementation, HP 9000 Series servers, also from Hewlett-Packard Company, may preferably be employed. Both the workstations and servers may run under the UNIX operating system and all software can be written in the C programming language. Tier three consists of mainframe computers 30 (Group 1) and time-share systems which, for example, access corporate data repositories 32 for customer records and service orders and other data.

1. Navigational Analysis Vehicle ("NAV")

The approach to navigational logic disclosed herein is based on the two software routines, NAV and MAP, as will now be describe din greater detail. NAV communicates navigational instructions to an X Windows-based user interface telling it which screens to display and take-down. NAV also communicates with other processes such as editors and data manipulators with standard, UNIX System V Interprocess Communications.

Figure 6:
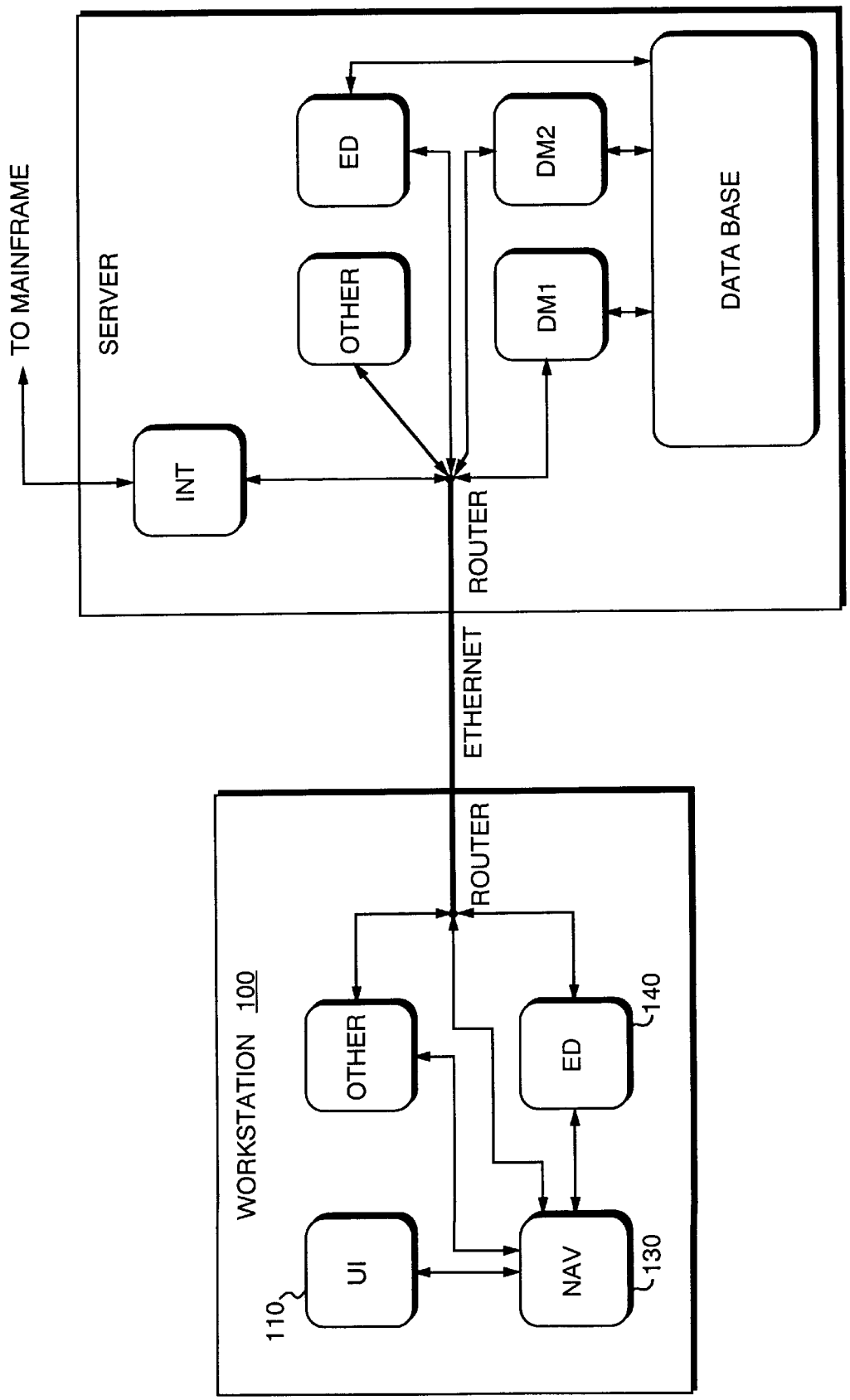
FIG. 6 schematically illustrates the software architecture of a typical client/server system.

FIG. 6 illustrates the architectural relationships between the user interface UI, NAV and other processes including editors and data manipulators (DMs) as are known to those skilled in the art. The UI 110 sends messages to NAV 130 using callbacks when events of interest occur. Examples include:

OK button is pressed in Screen_1

Cancel button is pressed in Screen_6

Other processes send messages to NAV when necessary. For example:

Async_Transaction reaches state Success_6 or Fix_1_

Required Screen_8 has been edited, updated or primed.

NAV 130, in turn, must send messages to the UI 110 (e.g., Display Screen_2). This case is different from the others because of the way the X Window system has been designed. X-Window is event-driven and is primarily set up to receive and process events from users via the X Server. However, there is a mechanism in X-Windows to recognize input from UNIX files which include pipes and sockets as well as conventional files. With the present invention, this mechanism is preferably used to establish a communication link into the UI using a combination of UNIX fifo (named pipe) and an IPC queue. The fifo was described to the UI and made available for reading with the XtAppAddInput function.

The transfer of a message is accomplished in two steps NAV 130 knows the fifo name and writes one byte to it whenever it is necessary to send a message. NAV 130 then sends the message to the appropriate IPC queue which the UI can access. On the UI 110 side, whenever data is written into the fifo, a UI function is called which accesses the IPC queue and reads the message.

NAV's main utility comes from its ability to retain complex relationships that affect the order and appropriateness of screen presentation. The relationships are contained in a matrix of navigational rules. Each row in the matrix represents a screen or other pertinent event which can occur at an unpredictable time.

2. Matrix Assembly Package ("MAP")

MAP is used to create the navigation rules in a user friendly, C-like language and parse them into ANSI standard C for linkage with the rest of the application. The conceptual model of navigation resembles a spread sheet or matrix where interactions between screens and other asynchronous events are viewed positionally. In other words, the position of an interaction defines the two participants of the interaction.

The main advantages of this approach are twofold. First, the navigational code is all together and isolated from the UI making maintenance a much easier task. Second, complex navigational relationships are more easily envisioned, described and implemented.

3. Matrix Concepts

Figure 7:
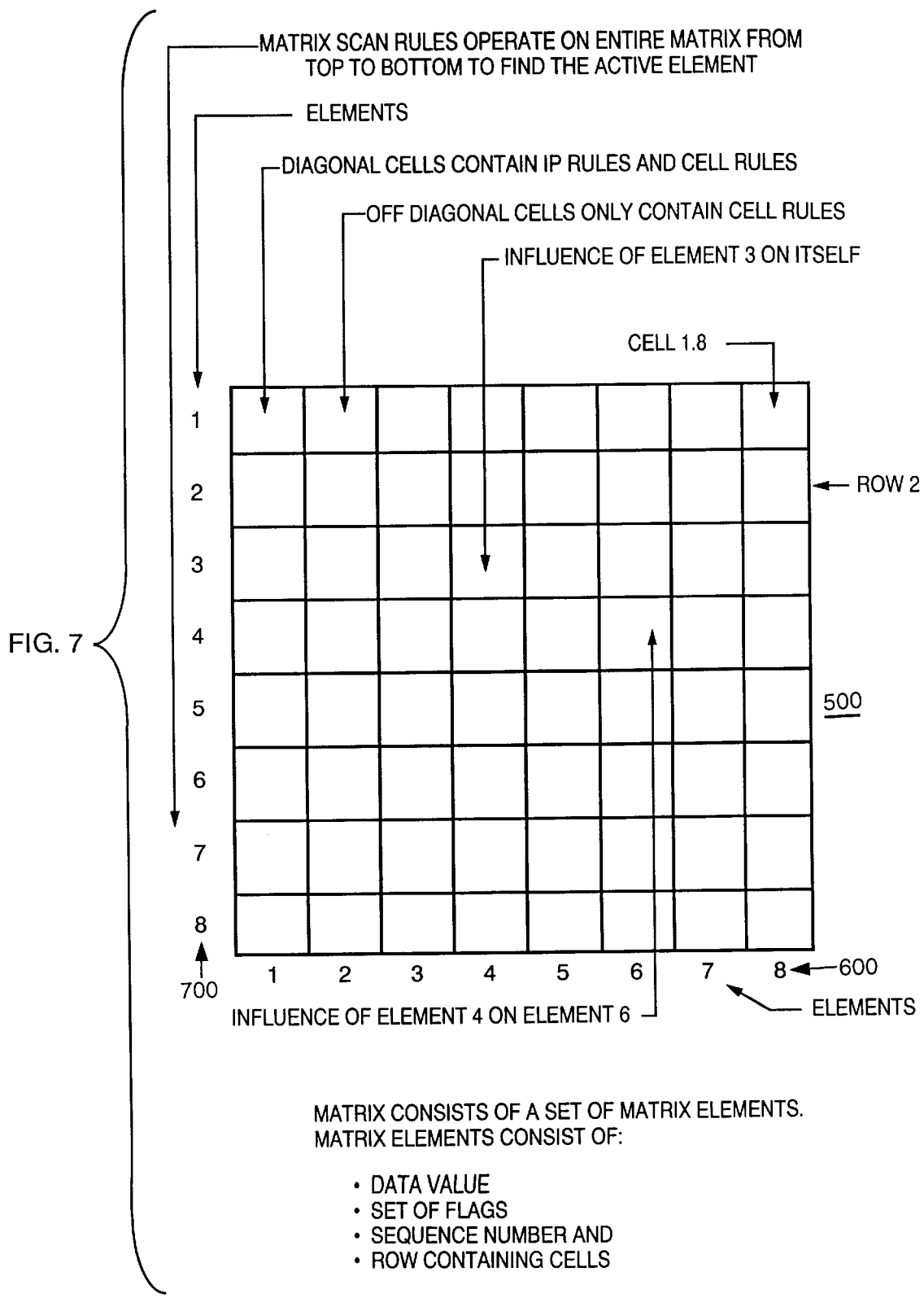
FIG. 7 pictorially illustrates the terminology and concepts embodied in the matrix approach to organization of navigational rules according to the present invention.

Referring now to FIG. 7, the matrix 500 looks like a spreadsheet in which each row (and column) corresponds to a screen or an asynchronous external event such as the status of Async_Transaction. The matrix is square. The rows 700 and columns 600 have identical labels.

Within the matrix 500, each cell contains a description of the effect of one row on one column (i.e., another row). The cell may contain any combination of values, processing steps, decision rules or indicator flags to express and alter the state of its row or other rows. In essence, the matrix describes how activities carried out in one window can affect other windows in the system and organizes these interactions in such a way that they are easy to describe and modify.

Multiple cause-and-effect relationships are organized into rows and columns. The row and column labels identify the names of the elements in the matrix, where an element is any value in the system which may effect another value. Therefore, the names of matrix elements are the names of rows (or columns).

The terms "element" and "row" are somewhat interchangeable but are differentiated as follows. Elements consist of a data value, a set of flags and a row containing cells.

There are as many cells in every row as there are elements in the matrix. The diagonal cell of any element's row represents the element's influence on itself. Other cells in the element's row represent the element's influence on other elements. Reading the contents of cells along an element's row describes how that element effects other elements in the system. Reading down its column describes how the element is affected by other elements.

The matrix model of a transactional flow is completely described using the following building blocks:

1. A set of elements each of which consists of a data value, a set of flags and a row containing cells. Cells "contain" cell rules described below. In the special case of diagonal cells, the cells "contain" initial processing (IP) rules which are a special set of things to do when the element becomes the "active" element. Only one element is active at any point in time.
2. A set of cell rules describing how elements in the system interact with one another (and themselves when the cell rule exists "in the diagonal cell").
3. A set of "matrix scan rules" which are used to determine which element is the next (or first) active element.

4. Matrix Elements

A matrix element can be any entity whose individual state affects the overall state of the system. Therefore, the entities chosen to be elements depend on the granularity of control required. For example, an element may represent a screen, a set of screens, the status of a particular data field on a screen, or the status of an asynchronous event such as Async_Transaction. Typically, all elements are selected to be at the same level of granularity although this is not a requirement. For the simple transaction shown in FIGS. 2 and 3, the 8 screens correspond to the elements of the matrix. The complex navigational example of FIGS. 4 and 5 includes 13 elements, the 12 screens which can appear and the status of Async_Transaction. These examples will be expended below.

The dynamic behavior of elements is described by the IP rules contained in diagonal cells and in the cell rules. IP rules are executed only when an element becomes active. An example of an action which probably belongs in the IP rules is priming or displaying a screen. Cell rules are executed only when the data value (see below) of the row changes. Both IP rules and cell rules are C functions, which manipulate element flags and data values. The only difference between the two types of rules is the time when they are executed or get fired.

Each element has a set of descriptors (a data value, several flags and a sequence number) to hold its current state. These descriptors are more fully discussed below. Initial values for element flags are read from a table when the application is started. This table may be accessed by the user group to customize the application.

The sequence number defines the relative order of the element. This is meaningful to the algorithm which finds the next active element, as is discussed later. The VALUE descriptor contains the current data value for the element. It may be set from other elements in the matrix or set by means of messages received by NAV.

The element flags are boolean, only taking on the two values TRUE and FALSE. These flags are named:

IGNORE
AVAILABLE
IMMEDIATE
WAIT
INSERT
REQUIRED
COMPLETED
OPEN
DATA_ONLY
DATA_CHANGED

The IGNORE flag indicates whether the element should be included. If the IGNORE flag for an element is set to TRUE, the element is essentially excluded from the matrix. This flag may be set by the end user and is useful for elements which are discretionary such as optional or regional screens.

As the name implies, the AVAILABLE flag indicates whether an element is available to be made the active element at the current time. It can be thought of as a more temporary flag than IGNORE.

The IMMEDIATE flag indicates that the element is a candidate for activation under the highest priority matrix scan rule (discussed below). The IMMEDIATE flag is generally used to immediately introduce a window into the normal flow. Examples would be error message windows, optional (child) windows selected by the user or other conditions requiring immediate user response.

Figure 5:
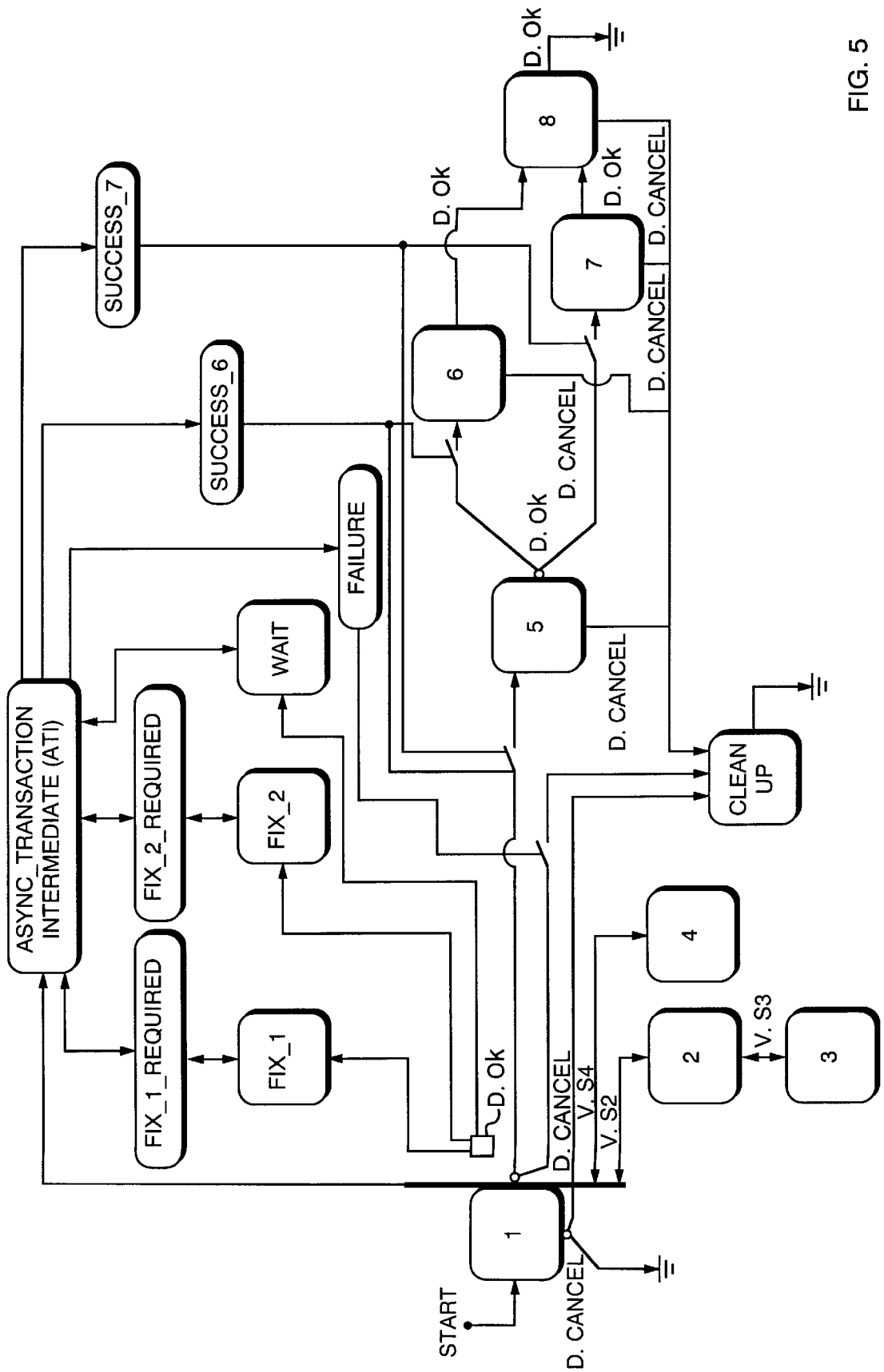
FIG. 5 illustrates a transition representation of a complex transactional flow, including twelve screens and interaction with an asynchronous event.

The WAIT, REQUIRED and INSERT flags all have the same (lowest) priority to the matrix scan rules. WAIT flags are used when a barrier must be placed on further normal flow processing rules (i.e., a wait state). The WAIT screen shown in the complex transaction of FIG. 5 is an example. INSERT flags are used when a screen which is only sometimes need is to be inserted into the normal flow. Screens Fix_1 and Fix_2 in FIG. 5 are examples. Either screen may be "inserted" into the normal flow so that Async_Transaction can complete. The REQUIRED flag indicates that the window must be completed by the user before a given sequence of windows can be finished. It is generally preset to indicate which screens are required to complete a transaction. In the examples, such as in FIG. 5, the sequence of Screens 1, 5, either 6 or 7, and 8 are required.

The COMPLETED flag is set to TRUE when the screen represented by the element has been logically completed. This allows NAV to know how much of the transaction is finished, thus assisting in the choice of the next active element. Generally a value of TRUE means that a window has been populated with all required fields or in the case of the two examples, "Ok" has been selected.

The DATA_ONLY flag indicates that the element represents a status of some kind and does not represent a window displayed to the user. In the complex flow of FIG. 5, the element which represents the status of Async_Transaction is an example of a DATA_ONLY element.

The OPEN flag indicates that a screen is currently displayed on the user's workstation. In the case of a DATA_ONLY type element, the OPEN flag is meaningless and is not used. Similarly, the OPEN_LINK identifier indicates the next window in a list of open windows and helps keep track of parent-child dependencies.

A value of TRUE for the flag indicates that a change has been made to the element's VALUE. Note that the DATA_CHANGED flag is set only when the element's data value is changed, not when flags are changed.

5. Typical Flow of Work
A. Transition Networks

Transition networks are a well known method of representing state information. In this parent disclosure, transition networks are utilized to illustrate transactional flow through a set of screens and events (states). Notation has been added to describe some of the complexities in real systems, which are more fully described. Two examples illustrate the method: a simple transactional flow and a complex transactional flow.

B. Simple Navigation

Figure 2:
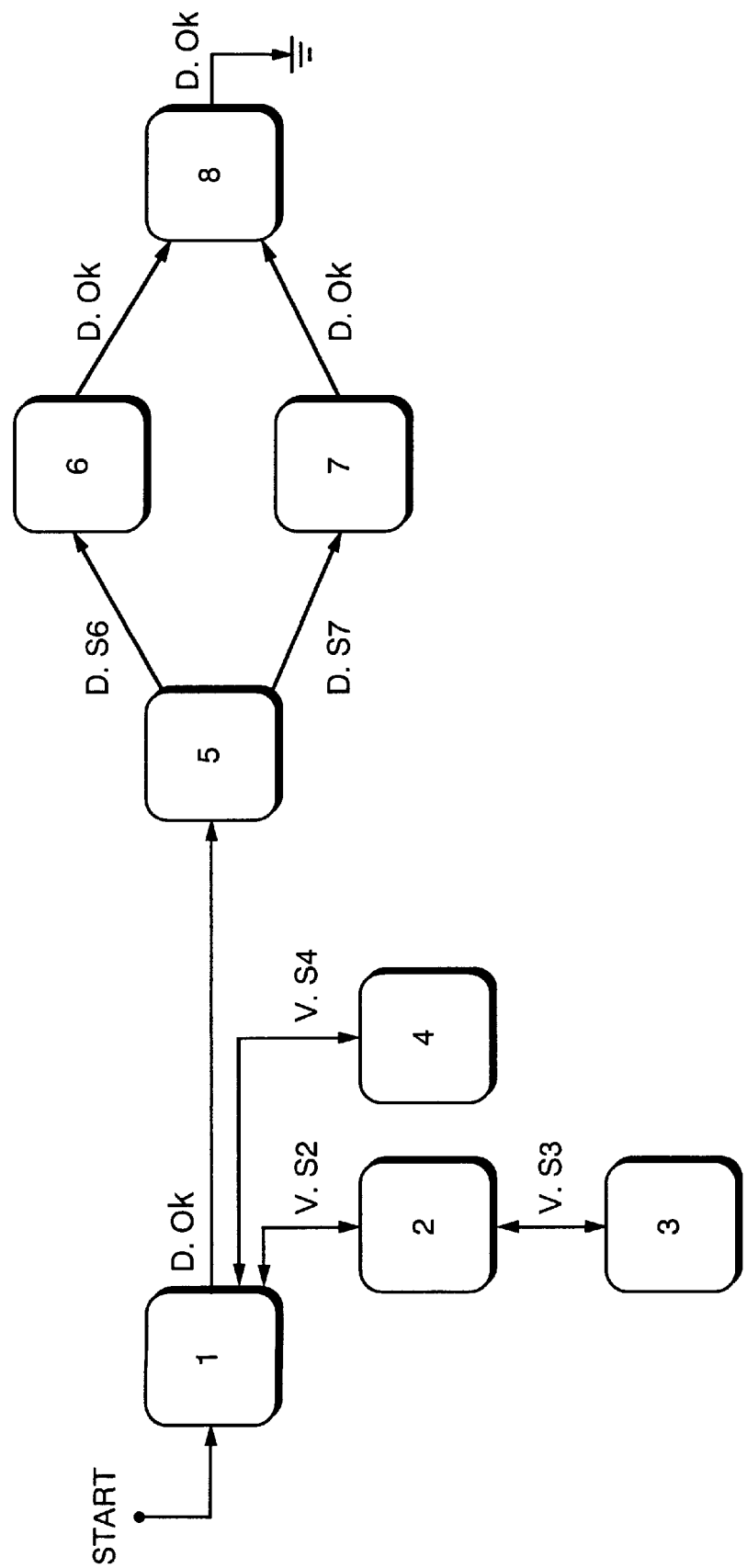
FIG. 2 illustrates a transition representation of a simple transactional flow, including eight screens.

FIG. 2 illustrates a simple transactional flow. This flow could easily be described and controlled with callback routines. The boxes are states in the flow. To the user of a system, they are screens. The connecting lines are transitions from screen to screen.

When a departure is made from a particular screen, the line indicates this transition to the next screen. The lines are called transition lines. If a screen remains visible upon departure from the screen, the letter V appears on the transition line near the screen which remains visible. If, on the other hand, the screen disappears from view the letter D appears. Direction is important and arrowheads are used to indicate direction on the diagram. An arrowhead pointing away from the screen is a leaving transition. One arrowhead pointing into the screen is an entering transition. If a transition line has an arrowhead on both ends it simply means that there exists a two way path between the two screens. Therefore, each screen can get to the other somehow. An example of this is a screen which has sub-screens or child screens which it can access as needed. If a parent screen remains visible while its child is accessed, it is possible for the parent to have more than one child screen visible at a time. In addition, children screens can have children in which case they are parents as well as children.

If more than one line emanates from a screen, a choice is possible and navigational logic must dictate the appropriate path. The logic can be based on both user input (e.g., a button press) and other state information. Conversely, if more than one path ends up a screen, it has not special meaning because the logic has been applied at the leaving end to get there.

Figure 3:
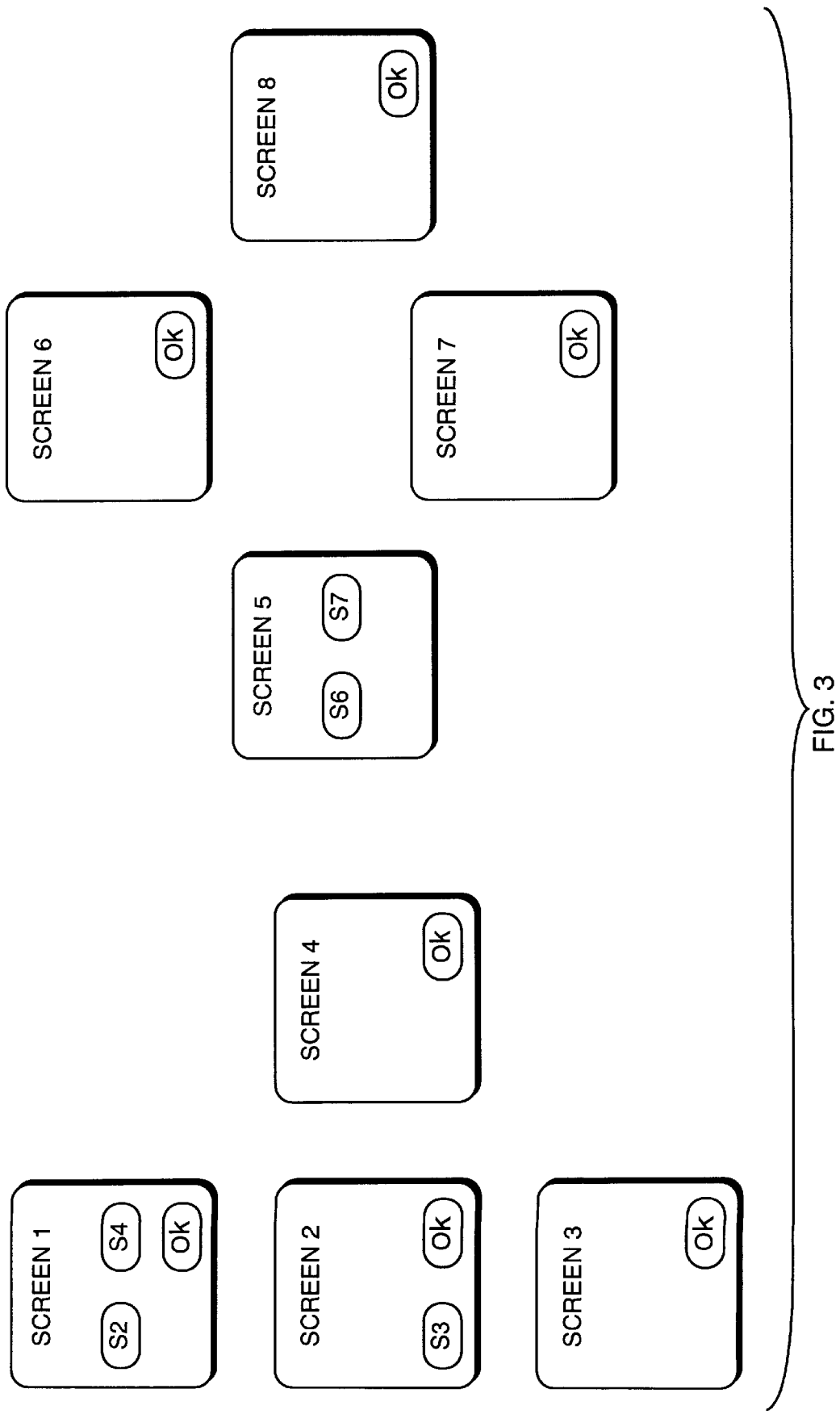
FIG. 3 schematically illustrates the screens of FIG. 2.

For the simple transition shown in FIGS. 2 and 3, the flow proceeds from Screen_1 to Screen_8. Departure from Screen_8 indicates completion of the transaction (ground symbol in FIG. 2). Screen_2 and Screen_4 (FIG. 2) are "child" screens of Screen_1 and Screen_3 is a child of Screen_2. Traversals from Screen_1 to Screens 2 or 4 (or 3) do not "make progress" in the flow through the transaction. That is, the user is getting no closer to the goal of completing the transaction in a diagrammatic sense although the user may be making great progress from the standpoint of customer satisfaction etc. Therefore, these transitions are shown at right angles to the flow or at least off of the direction toward the final screen (Screen_8 in this case). Screens 2, 3 and 4 are, in fact, optional to completing the transaction.

Screen_5 is the next screen which makes progress toward completing the transaction and it is not optional. Then a choice exists in which traversal can be to either of Screens 6 or 7, but at least one is required. Finally, Screen_8 is reached and upon its completion the transaction is complete as shown by a transition line to ground.

The screen images are shown in FIG. 3. Each transition corresponds to a button on one of the screens. AS the user presses appropriate buttons, a transition occurs to the next screen. The screen event causing the transition is shown near each of the transition lines at their exit from the screen in FIG. 3 (e.g., OK on transition line from Screen_1 to Screen_5).

Note that transitions do not have to depend on button press events. They could in fact depend on user input to a field, selection from a set of "radio buttons" or highlighting a field or set of fields, as well as other types of user-initiated events. The button press event is used in these examples for the sake of simplicity.

This simplified example is somewhat impractical for other reasons also. It lacks the ability to cancel out of the flow and does not include priming of screens, editing or updating databases, with associated error handling. It does, however, illustrate how transition networks can represent the navigational flow through a simple transaction. At this level of complexity, there is really no need for methods other than the callbacks provided in X-Windows.

C. Complex Navigation

Figure 4:
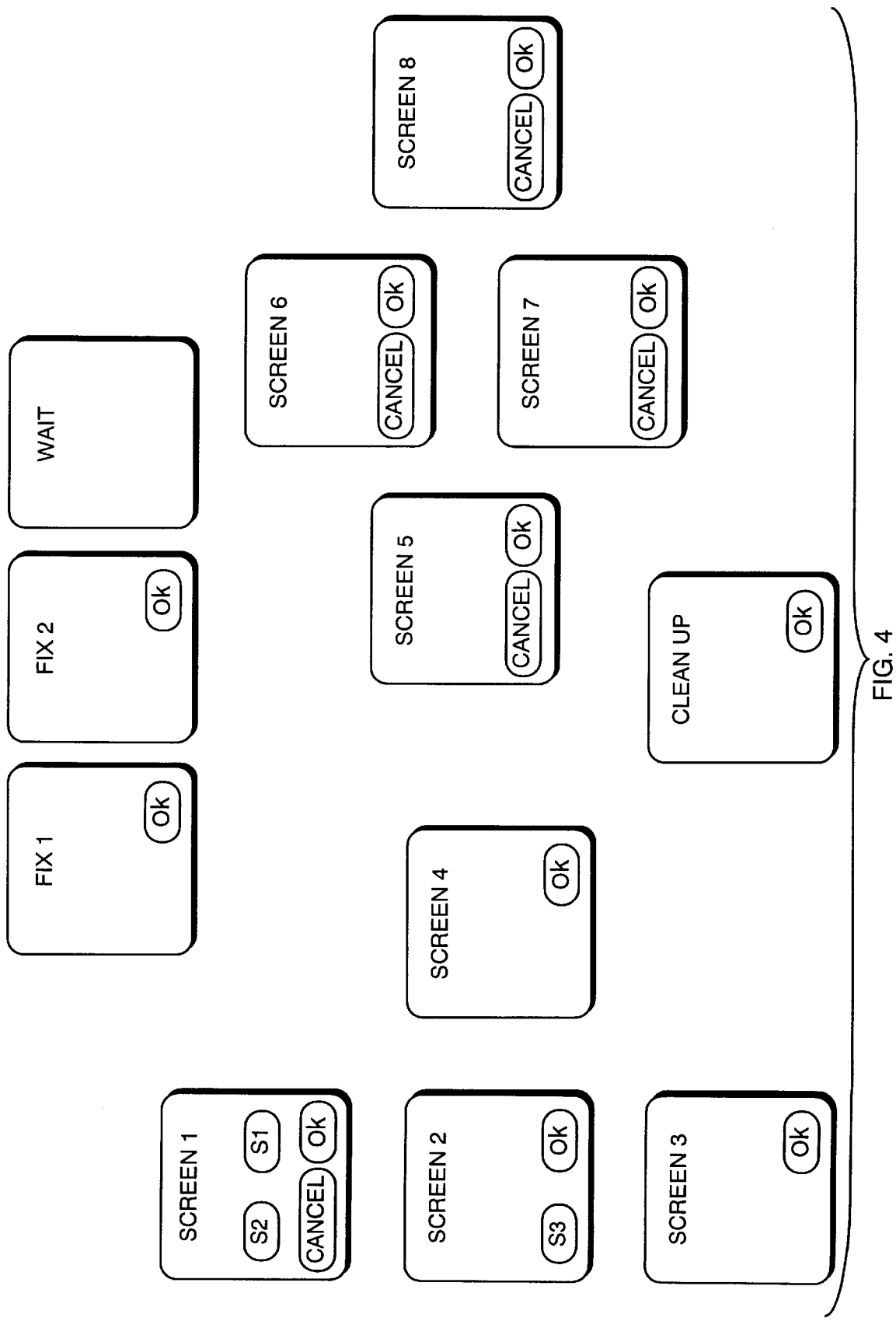
FIG. 4 schematically illustrates the screens of FIG. 5.

To illustrate a complex case, asynchronous access to a foreign machine and the ability to cancel out of the flow are added to the relatively simple flow of FIGS. 2 and 3 to arrive at the complex flow of FIGS. 4 and 5. Moreover, one of the screens, Screen_8, requires priming, editing and a database update, which illustrates a more common screen management scenario. The screens' images are shown in FIG. 4 and the transitions are shown in FIG. 5. Note that the S5 and S6 buttons on Screen_5 have been replaced with an Ok button. Now, the system will determine which path to take and present the appropriate screen. The choice will depend on the results of the asynchronous access to a tier three machine which is simply called Async_Transaction.

Async_Transaction is supposed to begin when a departure is made from Screen_1. This includes any transition to another screen whether it be a child of Screen_1 (Screens 2 or 4) or the next screen in the flow (Screen_5). The advantage of starting Async_Transaction at any of these transitions is that if child screens are visited, there is more time available for the transaction to complete while the user is doing useful work.

The transition network shown in FIG. 5 shows the being of Async_Transaction by a bold vertical line on the right side of Screen_1. Any transition line starting on the bold line initiates the asynchronous transaction. Note that this does not include the Cancel button which takes one of two possible paths depending on whether or not Async_Transaction has begun.

The processing of Async_Transaction is also represented as a transition network but with less detail than the one which represents the transactional flow through the UI. States or events having to do with Async_Transaction are represented by the elongated boxes. Complexities of the access to the foreign machine, which are of no interest here, are represented by the large box labeled Async_Transaction-Intermediate (ATI). The remaining elongated boxes are final events indicating completion. The screens Fix_1 and Fix_2 indicate intermediate results requiring further user input to resolve some issue. They are connected both to the UI flow and to the flow of Async_Transaction as indicated by the two-way transition lines.

The small circular dot to the right of Screen_1 represents the fact that any of the transition lines connected there can occur as a result of a single X event (e.g., a button push). For Screen_1, pressing the OK button (FIG. 5) can result in taking any of the paths shown. There are five possible paths and the one taken at any given time depends on both the intermediate and final results of Aysnc_Transaction.

Examining these transitions more closely reveals the complexities involved. First, the three screens which are connected both to ATI and to the UI flow are intermediate screens which only appear as necessary. The two Fix screens appear only when:

1. The user has pressed OK on Screen_1 to move on in the flow.
2. Async_Transaction has reached an intermediate stopping point in its flow and needs user input (via Fix_1 and Fix_2).

The Wait screen appears only when:

1. The user has pressed OK on Screen_1 to move on in the flow.
2. Async Transaction is still in process (ATI) and is not currently at an intermediate or final state.

The Fix screens return control to Async_Transaction when their OK button is pushed. The Wait screen has no buttons. It just appears when it should and disappears when it should. In this case, the transition line between Screen_1 and the Wait screen means simply that the Wait screen will appear at this point in the flow if it is appropriate for it to do so. How this is accomplished will be discussed in the next section.

Clearly, a number of scenarios are possible when the user presses Ok in Screen_1. One possibility is that Screen_5 appears without any intervening Fix screens or the Wait screen. This would be the case if Async_Transaction proceeded to a successful completion faster than the user progressed to the Ok button on Screen_1 and there were no clarifications (Fix screens) necessary. If, on the other hand, Async_Transaction completes more slowly than the user, the Wait screen appears. Among other possibilities, Async_Transaction could fail at which time the user is presented with Cleanup and the transaction is finished, albeit unsuccessfully.

Note that the Fix screens could be required to appear at the other points in the UI flow. This would be represented by connecting their UI transition lines to those points. It is also possible that one asynchronous transaction could trigger another. In many systems multiple asynchronous transactions are initiated one from the other. The transition network becomes complex but the behavior is entirely describable. Making these behaviors occur as required will be discussed in the next section.

The other two transitions exiting from Screen_1 are connected to the elongated boxes corresponding to final events. Only one of these paths is allowed, therefore a switch notation is used to help represent these cases. When Async_Transaction reaches a final state, the switches connected to that state (by the curved lines) are closed, thus allowing the UI flow to proceed along that path(s). So, if Async_Transaction fails, the user is presented with a Clean_Up screen after pressing OK on Screen_1. Also, all attempts by the user to cancel, after Async_Transaction has begun, cause the Clean_Up screen to appear on the way out of the transaction. Only a cancellation from Screen_1 prior to initiating Async_Transaction avoids being presented with Clean Up screen.

Async_Transaction can succeed in two possible ways (Success_6 and Success_7). Screen_5 is always the next screen in the flow, thus both success conditions activate the switch between Screens 1 and 5. The switch from Screen_5 to Screen_6 is activated by Success_6 indicating that this is the required path. Conversely, Screen_7 is made available instead of Screen_6 when Success_7 has occurred.

As complex as this flow appears to be, it still leaves out numerous details. For example, it only includes one screen which must be primed with data, edited and updated when, in fact, most screens require these actions. In addition, no error conditions are checked and handled.

A transition network of the required transactional behavior is first created. From this network a description of the matrix is devised and placed in a matrix file. This file contains a description of all elements which comprise the matrix including initial flag values, a sequence number, IP rules and any cell rules. Examples of these will be presented for the two previously discussed cases and syntax will be discussed at that time.

Once a matrix file has been created, the matrix file is compiled by MAP into several code modules and header files. These modules and header files are then linked to and accessed by NAV. NAV contains a matrix data structure with a list of all the elements, their flags, data values and sequence numbers. Cell and IP rules are translated by MAP into C functions. NAV's matrix data structure contains pointers to these functions, thus allowing access to them as though they were organized by rows and columns.

The MAP-generated codes is processed by NAV using the logic described below. In addition to processing the MAP-generated code, NAV also processes messages that NAV receives from the UI or other processes. Those messages contain new data values for matrix elements and are constructed by the UI and other processes (e.g., editors and DMs) to inform NAV of significant events which determine the further flow of the application. These events include, illustratively, entry of data into a particular field, an indication that the user has pressed a button, or a return from an external process.

6. Navigational Algorithm

Figure 8:
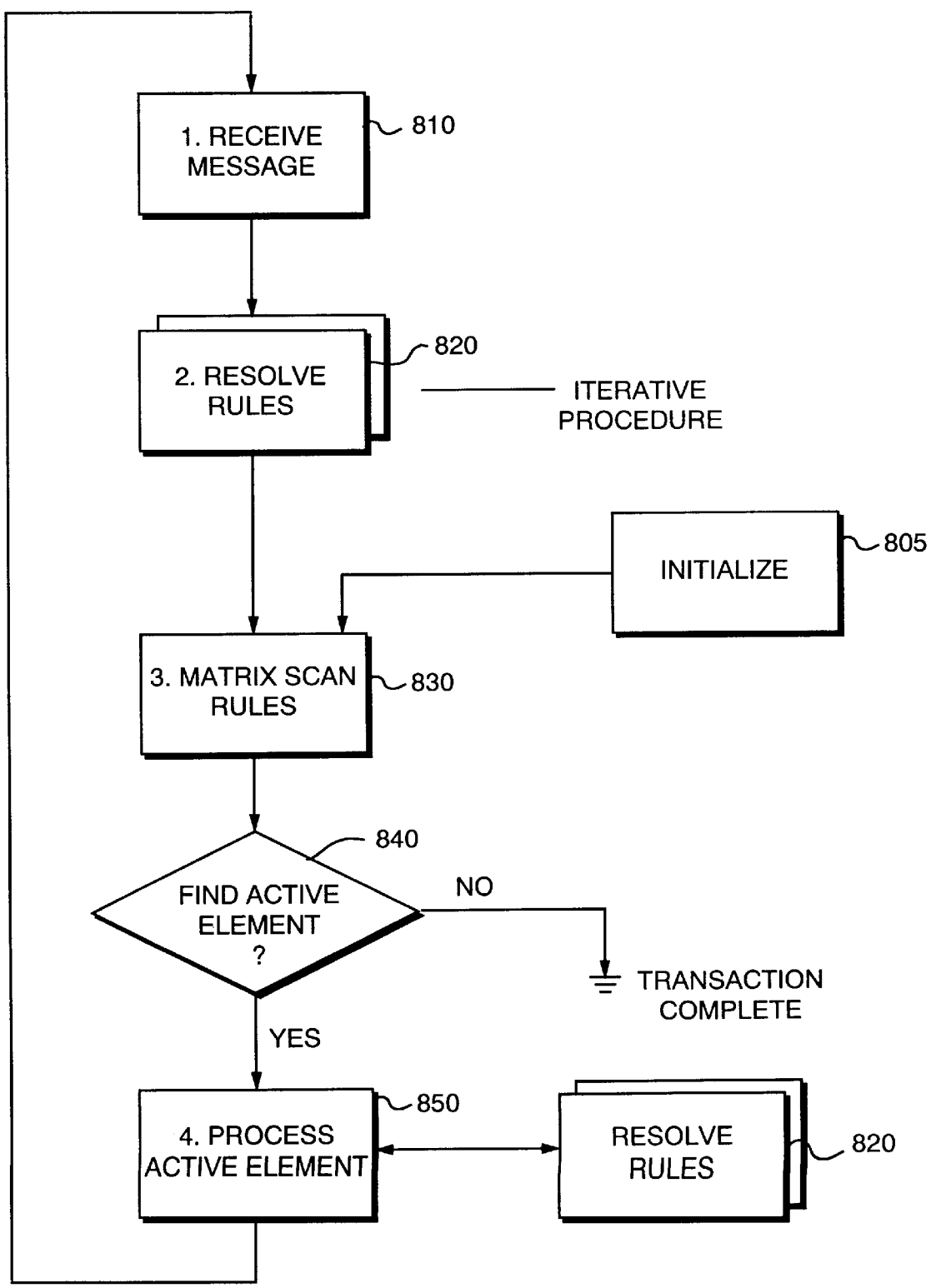
FIG. 8 schematically illustrates the flow of steps for the navigational algorithm embodied in the NAV software.

Turning now to FIG. 8, after initialization, the Navigational Algorithm is cyclic and begins when a message arrives at task 810. The salient steps in the Navigational Algorithm include:

1. RECEIVE MESSAGE (Task 810);
2. RESOLVE RULES (Task 820);
3. RUN MATRIX SCAN RULES TO FIND THE "ACTIVE" ELEMENT (Task 830);
4. CHECK TO SEE IF THE ACTIVE ELEMENT HAS BEEN FOUND (Task 840);
5. Process the Active Element (Task 850).

Each step is described fully in turn below.

STEP 1. RECEIVE MESSAGE. When a message arrives, it is read from the input queue at Task 810. Part of the message contains an element name to which the message is addressed. The element's data value (row_no.VALUE) is set to a unique message identifier (e.g., Screen2OkSelected, which has been #defined to type integer). The element to which the message was addressed now becomes the current (not active) element.

STEP 2. RESOLVE RULES. At task 820, if the now-current element's data value has changed (thereby setting the element's data changed flag to TRUE), the data changed flag is reset to FALSE and the element's entire row is checked for cell rules which can "fire". This is called "running the row" and consists of executing code (cell rules which can fire) in each interaction cell across the element's row starting on the diagonal at the element's interaction with itself and eventually wrapping around to itself again.

If this process changes the data value (not the flags) of any other elements in the matrix, the data changed flags for those elements are set to TRUE. If this process changes the flags only of any other elements in the matrix, the data changed flags for those elements are not set to TRUE.

Then, the rows of any other elements in the matrix whose data value has been changed are handled similarly. This is continued until no element's data value changes or until the maximum number of iterations allowed has been reached. If the maximum number of iterations allowed is reached, NAV issues an error message.

STEP 3. RUN MATRIX SCAN RULES TO FIND THE "ACTIVE" ELEMENT. Initialize matrix scan rules 805. At task 830, determine the next matrix element to become the active element using the Matrix Scan Rules (discussed below).

If there are no elements matching the selection rules, the application is complete, and any needed cleanup and file closures are executed before terminating the NAV process.

STEP 4. PROCESS THE ACTIVE ELEMENT. At task 840, a check is made to see if the active element has been found. When it is found, if it is not yet open, its IP rules are executed at Task 850. In most cases, this will include priming or displaying a window. If the element is a DATA_ONLY type element (as indicated by the flag DATA_ONLY=TRUE), its OPEN flag is still checked as above, but the OPEN flag has no meaning for DATA_ONLY elements. Typically, DATA_ONLY elements have no IP rules. Finally, after task 850, another message is received at the input queue, i.e. the algorithm recycles to task 810.

The IP rules can change both the data values and flags of any other elements, or its own data value and/or flags. If data values are changed, the Resolve Rules step, as previously described above, is executed, otherwise (i.e. if nothing is changed or if only flags are changed) the Resolve Rules step is not executed. The latter case (with no execution of the Resolve Rules step required after IP rules) is more typical.

If the active element is already open, the element's IP rules are bypassed (e.g., do nothing, the window is open and not completed).

In either case (open or not) return to the input message queue to wait for a new message.

7. Matrix Scan Rules Algorithm

Figure 9:
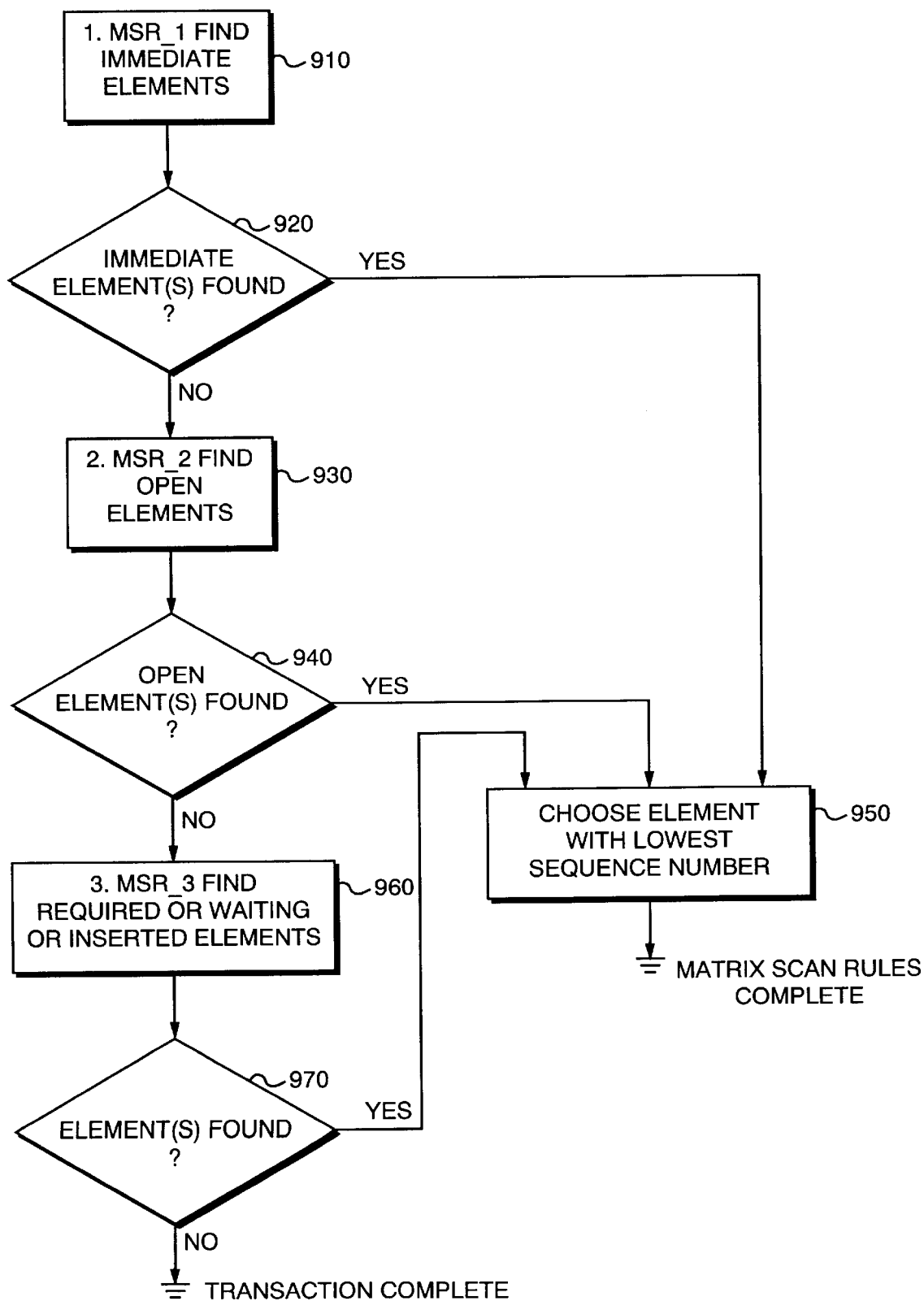
FIG. 9 schematically illustrates the flow of steps for operation of the matrix scan rules embodied in the NAV software.
Figure 10:
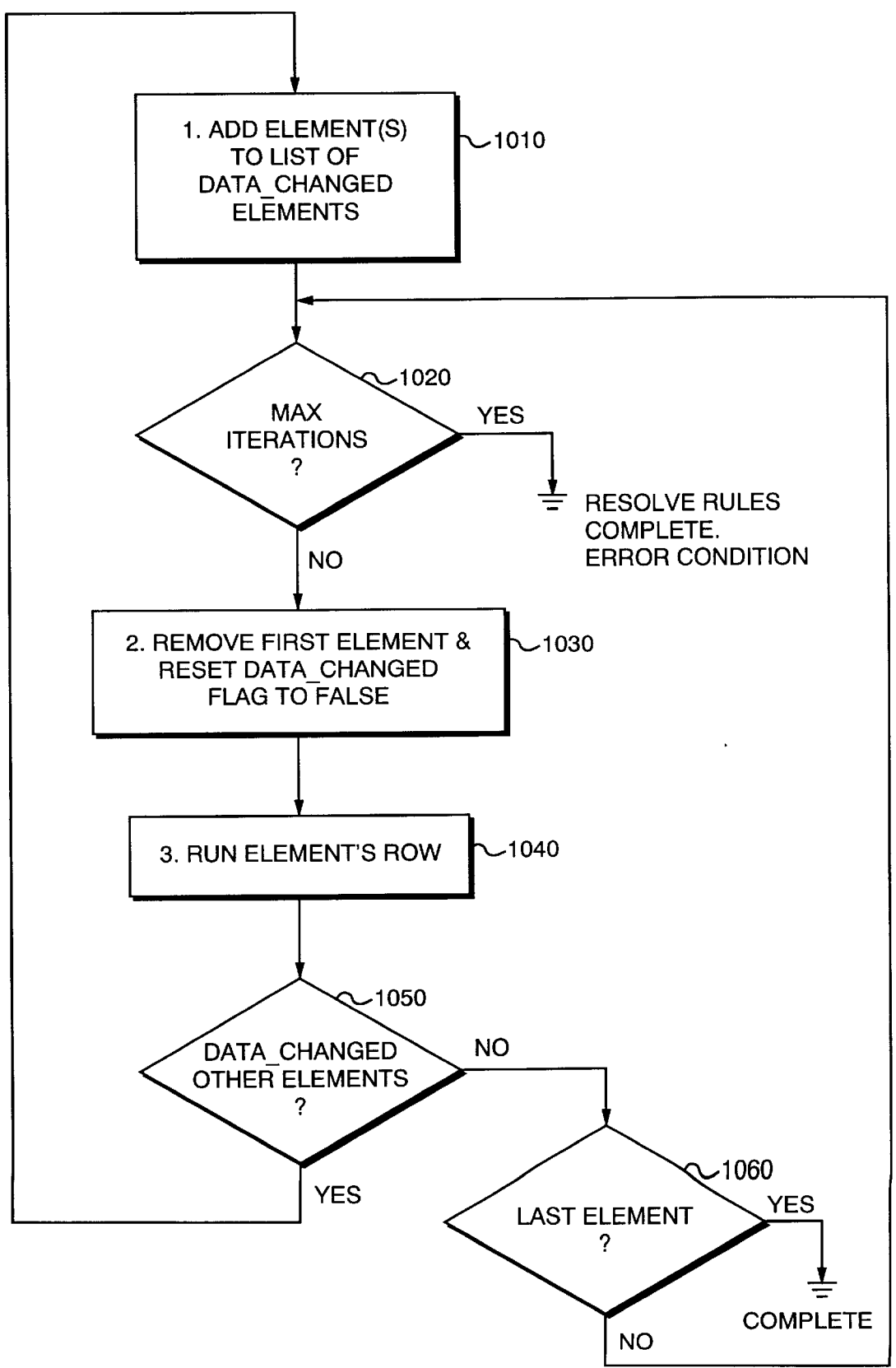
FIG. 10 schematically illustrates the flow of steps for operation of the Resolve Rules algorithm embodied in the NAV software.

Three Matrix Scan rules (MSRs) are used to locate the next (or first) active element in the matrix. The Matrix Scan rules algorithm is illustrated in FIG. 9. The rules all function by scanning the entire matrix, and examining the flags for all of the elements in the matrix. Order is important, so if one of the three rules finds candidates to be the active element, subsequent rules are not checked.

MATRIX SCAN RULE 1 (MSR_1). At task 910, a search is conducted for an immediate element. All elements which are not ignored, available and immediate are found, at task 920. The one with the lowest sequence number is selected at task 950. The purpose of this rule is to force interruption in the normal required window flow. In other words, IF (the element flags are: (not IGNORED) and AVAILABLE and IMMEDIATE), THEN this rule succeeds.

MATRIX SCAN RULE 2 (MSR_2). At task 930, a search is conducted for an open element. If there are no elements which match the Matrix Scan Rule 1 above, then search for an open element. All elements which are not ignored, available, open, and not completed, and found, at task 940. Then the one with the lowest sequence number is selected at task 950. Matrix Scan Rule 2 is used to resolve open windows before initiating new windows. In other words, IF (the element flags are: (not IGNORED) and AVAILABLE and OPEN and (not COMPLETED)), THEN this rule succeeds.

MATRIX SCAN RULE 3 (MSR_3). At task 960, a search is conducted for the next required, waiting or inserted element. If there are no elements which match the first or second rules, then a search is made for the next required, waiting or inserted element. Further, at task 970 all elements are found which are not ignored, available, either required, waiting or inserted and not completed. Then the one with the lowest sequence number is selected at task 950. The purpose of Matrix Scan Rule 3 is to continue with the normal, required window flow, or the alter the normal flow with a wait type screen or an inserted type screen. In other words, IF (the element flags are: (not IGNORED) and AVAILABLE and (REQUIRED or WAITING or INSERTED)), THEN this rule succeeds.

If none of the three Matrix Scan rules is matched, all required windows have been completed and all windows are closed, and the application is therefore complete.

8. Examples of Code For Simple and Complex Transactions

Two examples, which correspond to the simple and complex transactional flows discussed above in the BACKGROUND OF THE INVENTION section of this patent disclosure, are presented. The code describing the IP rules and cell rules is explained, along with examples of the C functions which are created from them by MAP. Operation of the Navigational Algorithm and Matrix Scan Rules is also illustrated.

A number of functions are available to NAV for sending messages to the UI, an editor, DM and ASYNC_TRANSACTION. These are used extensively within the cell and IP rules. Illustratively, these functions are:

int send_UI_messge(int msg_id);

int send_EDITOR_message(int row_no, int msg_id);

int send_DM_message(int row_no, int msg_id);

int send_ASYNC_TRANSACTION_message(int row_no, int msg_id).

Note that these functions are specific to the two examples below. Other uses may require that users write their own "send" functions.

A. Simple Navigation

Figure 11:
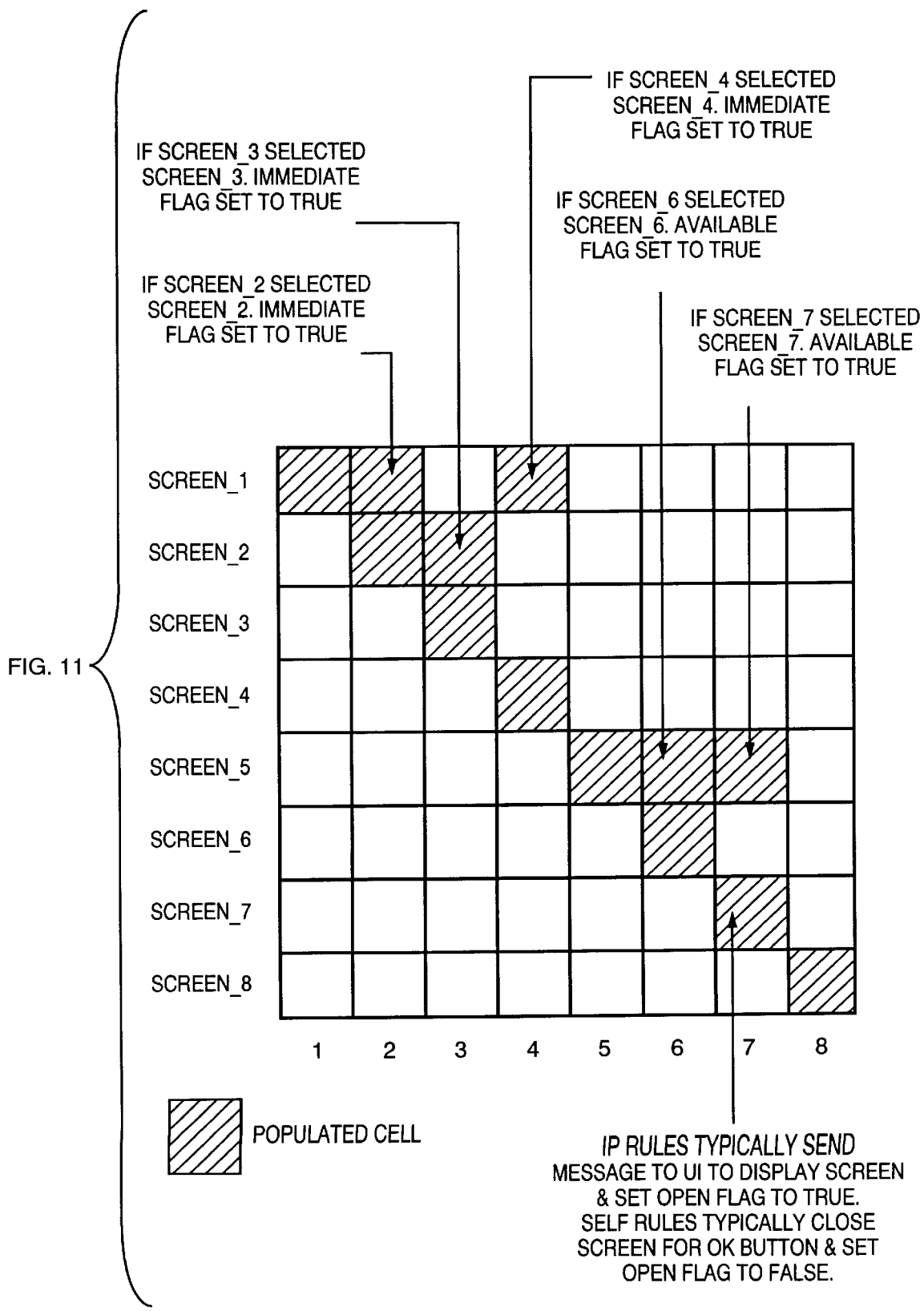
FIG. 11 pictorially illustrates the interactions and cell rules for a simple navigational case.

TABLE I illustrates the code describing the IP rules and cell rules for the simple navigational flow. In addition, TABLE II illustrates the C functions for IP and cell rules after translation by MAP. As previously mentioned, this relatively simple example includes eight elements, one for each screen in the flow. FIG. 11 illustrates the locations of cell rules for the entire flow.

TABLE I

MATRIX DESCRIPTION CODE FOR SIMPLE FLOW

```
/*
/*
   FLAGS
   TFFFFFFFFF    IGNORE
   FTFFFFFFFF    AVAILABLE
   FFTFFFFFFF    IMMEDIATE
   FFFTFFFFFF    WAIT
   FFFFTFFFFF    INSERT
   FFFFFTFFFF    REQUIRED
```

TABLE I-continued

MATRIX DESCRIPTION CODE FOR SIMPLE FLOW

```
   FFFFFFTFFF    COMPLETED
   FFFFFFFTFF    OPEN
   FFFFFFFFTF    DATA_ONLY
   FFFFFFFFFT    DATA_CHANGED
   FFFFFFFFFF100    SEQ_NO = 100
*/
/*
int send_UI_message( int msg_id );
int send_EDITOR_message( int row_no, int msg_id );
int send_DM_message( int row_no, int msg_id );
int send_ASYNC_TRANSACTION_message( int row_no,
int msg_id );*/
/*
8 Elements with Rows:
SCREEN_1
SCREEN_2
SCREEN_3
SCREEN_4
SCREEN_5
SCREEN_6
SCREEN_7
SCREEN_8
*/
/*
INCLUDE example_msg.h
INCLUDE cmss_structs.h
INCLUDE NSI_Res_test_Global_Messages.h
FLOW example_simple_flow
*/
ROW
SCREEN_1
    FLAGS FTFFFTFFFF100
    PROC
    {
    #
        row_no.OPEN = TRUE;
        send_UI_message(Screen1Display);
    #
    SCREEN_3
    {
    #
        if(row_no.VALUE == Screen3Selected)
        {
            SCREEN_3.IMMEDIATE = TRUE;
        }
    #
    }
NULL
ROW
SCREEN_3
    FLAGS FTFFFFFFFF
    PROC
    {
    #
        row_no.IMMEDIATE = FALSE;
        row_no.OPEN = TRUE;
        send_UI_message(Screen3Display);
    #
    }
    SELF
    {
    #
        if(row_no.VALUE == Screen3OkSelected)
        {
            row_no.OPEN = FALSE;
            row_no.COMPLETED = TRUE;
            send_UI_message(Screen3Close);
        }
    #
    }
NULL
ROW
SCREEN_4
    FLAGS FTFFFFFFFF
    PROC
    {
    #
```

TABLE I-continued

MATRIX DESCRIPTION CODE FOR SIMPLE FLOW

```
        row_no.IMMEDIATE = FALSE;
        row_no.OPEN = TRUE;
        send_UI_message(Screen4Display);
    #
    }
    SELF
    {
    #
        if(row_no.VALUE == Screen4OkSelected)
        {
            row_no.OPEN = FALSE;
            row_no.COMPLETED = TRUE;
            send_UI_message(Screen4Close);
        }
    #
    }
    SELF
    {
    #
        if(row_no.VALUE == Screen1OkSelected)
        {
            row_no.OPEN = FALSE;
            row_no.COMPLETED = TRUE;
            send_UI_message(Screen1Close);
        }
    #
    }
    SCREEN_2
    {
    #
        if(row_no.VALUE == Screen2Selected)
        {
            SCREEN_2.IMMEDIATE = TRUE;
        }
    #
    }
    SCREEN_4
    {
    #
        if(row_no.VALUE == Screen4Selected)
        {
            SCREEN_4.IMMEDIATE = TRUE;
        }
    #
    }
NULL
ROW
SCREEN_2
    FLAGS FTFFFFFFFF
    PROC
    {
    #
        row_no.IMMEDIATE = FALSE;
        row_no.OPEN = TRUE;
        send_UI_message(Screen2Display);
    #
    }
    SELF
    {
    #
        if(row_no.VALUE == Screen2OkSelected)
        {
            row_no.OPEN = FALSE;
            row_no.COMPLETED = TRUE;
            send_UI_message(Screen2Close);
        }
    #
    }
    }
NULL
ROW
SCREEN_5
    FLAGS FTFFFTFFFF1300
    PROC
    {
    #
        row_no.OPEN = TRUE;
        send_UI_message(Screen5Display);
    #
    }
    SELF
    {
    #
        if(   (row_no.VALUE == Screen6Selected) ||
              (row_no.VALUE == Screen7Selected) )
        {
            row_no.OPEN = FALSE;
            row_no.COMPLETED = TRUE;
            send_UI_message(Screen5Close);
        }
    #
    }
/* User selects from either Screen 6 or Screen 7 */
    SCREEN_6
    {
    #
        if(row_no.VALUE == Screen6Selected)
        {
            SCREEN_6.AVAILABLE = TRUE;
        }
    #
    }
    SCREEN_7
    {
    #
        if(row_no.VALUE == Screen7Selected)
        {
            SCREEN_7.AVAILABLE = TRUE;
        }
    #
    }
NULL
/* Screens 6 & 7 are REQUIRED but start with AVAILABLE flag =
FALSE */
ROW
SCREEN_6
    FLAGS FFFFTFFFF1350
    PROC
    {
    #
        row_no.OPEN = TRUE;
        send_UI_message(Screen6Display);
    #
    }
    SELF
    {
    #
        if(row_no.VALUE == Screen6OkSelected)
        {
            row_no.OPEN = FALSE;
            row_no.COMPLETED = TRUE;
            send_UI_message(Screen6Close);
        }
    #
    }
NULL
ROW
SCREEN_7
    FLAGS FFFFTFFFF1375
    PROC
    {
    #
        row_no.OPEN = TRUE;
        send_UI_message(Screen7Display);
    #
    }
    SELF
    {
    #
        if(row_no.VALUE == ScreenOkSelected)
        {
            row_no.OPEN = FALSE;
            row_no.COMPLETED = TRUE;
            send_UI_message(Screen7Close);
```

TABLE I-continued

MATRIX DESCRIPTION CODE FOR SIMPLE FLOW

```
        }
    #
    }
NULL
ROW
SCREEN_8
    FLAGS FTFFFTFFFF1400
    PROC
    {
    #
        row_no.OPEN = TRUE;
        send_UI_message(Screen8Display);
    #
    }
    SELF
    {
    #
        if(row_no.VALUE == Screen8OkSelected)
        {
            row_no.OPEN = FALSE;
            row_no.COMPLETED = TRUE;
            send_UI_message(Screen8Close);
            send_UI_message(EndFlow);     /* Transaction complete,
shut down */
        }
    #
    }
NULL
END
```

TABLE II

C CODE FOR MAP - SIMPLE TRANSACTIONAL FLOW

```
/*
 *
 *
 *
 *
/*
 *
 *
 *
 *
*/
#include <stdio.h>
#include <string.h>
#include "nav_constants.h"
#include "navigator.h"
#include "JFMM_row.h"
#include "message.h"
#include "msg_constants.h"
#include "JFMM_std_data_msg.h"
extern int   send_UI_message( );         /* matrix_util.c */
extern int   set_flag_value( );          /* matrix_util.c */
extern int   set_data_value( );          /* matrix_util.c */
extern int   set_global( );              /* matrix_util.c */
extern int   my_value( );                /* matrix_util.c */
extern int   my_global( );               /* matrix_util.c */
extern int   my_flag( );                 /* matrix_util.c */
extern MATRIX matrix;
/*- - - - - - - - - - - - - - - - - - - -[ PROCESSING
]- - - - - - - - - - - - - - - - - - - -*/
int
SCREEN_1_proc( )
{
    char   row_no = SCREEN_1;
    set_flag_value(row_no,OPEN,TRUE);
        send_UI_message(Screen1Display);
        return TRUE;
}
int
SCREEN_2_proc( )
{
    char   row_no = SCREEN_2;
```

TABLE II-continued

C CODE FOR MAP - SIMPLE TRANSACTIONAL FLOW

```
    set_flag_value(row_no,IMMEDIATE,FALSE);
        set_flag_value(row_no,OPEN,TRUE);
        send_UI_message(Screen2Display);
        return TRUE;
}
int
SCREEN_3_proc( )
{
    char   row_no = SCREEN_3;
    set_flag_value(row_no,IMMEDIATE,FALSE);
        set_flag_value(row_no,OPEN,TRUE);
        send_UI_message(Screen3Display);
        return TRUE;
}
int
SCREEN_4_proc( )
{
    char   row_no = SCREEN_4;
    set_flag_value(row_no,IMMEDIATE,FALSE);
        set_flag_value(row_no,OPEN,TRUE);
        send_UI_message(Screen4Display);
        return TRUE;
}
int
SCREEN_5_proc( )
{
    char   row_no = SCREEN_5;
    set_flag_value(row_no,OPEN,TRUE);
        send_UI_message(Screen5Display);
        return TRUE;
}
int
SCREEN_6_proc( )
{
    char   row_no = SCREEN_6;
    set_flag_value(row_no,OPEN,TRUE);
        send_UI_message(Screen6Display);
        return TRUE;
}
int
SCREEN_7_proc( )
{
    char   row_no = SCREEN_7;
    set_flag_value(row_no,OPEN,TRUE);
        send_UI_message(Screen7Display);
        return TRUE;
}
int
SCREEN_8_proc( )
{
    char   row_no = SCREEN_8;
    set_flag_value(row_no,OPEN,TRUE);
        send_UI_message(Screen8Display);
        return TRUE;
}
/*- - - - - - - - - - - - - - - - - - - -[ INTERACTIONS
]- - - - - - - - - - - - - - - - - - - -*/
int
SCREEN_1_SCREEN_1_inter( )
{
    char   row_no = SCREEN_1;
    if(my_value(row_no,Screen1OkSelected))
    {
        set_flag_value(row_no,OPEN,FALSE);
        set_flag_value(row_no,COMPLETED,TRUE);
        send_UI_message(Screen1Close);
    }
    return TRUE;
}
int
SCREEN_1_SCREEN_2_inter( )
{
    char   row_no = SCREEN_1;
    if(my_value(row_no,Screen2Selected))
    {
        set_flag_value(SCREEN_2,IMMEDIATE,TRUE);
    }
```

TABLE II-continued
C CODE FOR MAP - SIMPLE TRANSACTIONAL FLOW

```c
        return TRUE;
}
int
SCREEN_1_SCREEN_4_inter( )
{
        char  row_no = SCREEN_1;
        if(my_value(row_no,Screen4Selected))
        {
                set_flag_value(SCREEN_4,IMMEDIATE,TRUE);
        }
        return TRUE;
}
int
SCREEN_2_SCREEN_2_inter( )
{
        char  row_no = SCREEN_2;
        if(my_value(row_no,Screen2OkSelected))
        {
                set_flag_value(row_no,OPEN,FALSE);
                set_flag_value(row_no,COMPLETED,TRUE);
                send_UI_message(Screen2Close);
        }
        return TRUE;
}
int
SCREEN_2_SCREEN_3_inter( )
{
        char  row_no = SCREEN_2;
        if(my_value(row_no,Screen3Selected))
        {
                set_flag_value(SCREEN_3,IMMEDIATE,TRUE);
        }
        return TRUE;
}
int
SCREEN_3_SCREEN_3_inter( )
{
        char  row_no = SCREEN_3;
        if(my_value(row_no,Screen3OkSelected))
        {
                set_flag_value(row_no,OPEN,FALSE);
                set_flag_value(row_no,COMPLETED,TRUE);
                send_UI_message(Screen3Close);
        }
        return TRUE;
}
int
SCREEN_4_SCREEN_4_inter( )
{
        char  row_no = SCREEN_4;
        if(my_value(row_no,Screen4OkSelected))
        {
                set_flag_value(row_no,OPEN,FALSE);
                set_flag_value(row_no,COMPLETED,TRUE);
                send_UI_message(Screen4Close);
        }
        return TRUE;
}
int
SCREEN_5_SCREEN_5_inter( )
{
        char  row_no = SCREEN_5;
        if( (my_value(row_no,Screen6Selected)) ||
(my_value(row_no,Screen7Selected)) )
        {
                set_flag_value(row_no,OPEN,FALSE);
                set_flag_value(row_no,COMPLETED,TRUE);
                send_UI_message(Screen5Close);
        }
        return TRUE;
}
int
SCREEN_5_SCREEN_6_inter( )
{
        char  row_no = SCREEN_5;
        if(my_value(row_no,Screen6Selected))
        {
                set_flag_value(SCREEN_6,AVAILABLE,TRUE);
        }
        return TRUE;
}
int
SCREEN_5_SCREEN_7_inter( )
{
        char  row_no = SCREEN_5;
        if(my_value(row_no,Screen7Selected))
        {
                set_flag_value(SCREEN_7,AVAILABLE,TRUE);
        }
        return TRUE;
}
int
SCREEN_6_SCREEN_6_inter( )
{
        char  row_no = SCREEN_6;
        if(my_value(row_no,Screen6OkSelected))
        {
                set_flag_value(row_no,OPEN,FALSE);
                set_flag_value(row_no,COMPLETED,TRUE);
                send_UI_message(Screen6Close);
        }
        return TRUE;
}
int
SCREEN_7_SCREEN_7_inter( )
{
        char  row_no = SCREEN_7;
        if(my_value(row_no,Screen7OkSelected))
        {
                set_flag_value(row_no,OPEN,FALSE);
                set_flag_value(row_no,COMPLETED,TRUE);
                send_UI_message(Screen7Close);
        }
        return TRUE;
}
int
SCREEN_8_SCREEN_8_inter( )
{
        char  row_no = SCREEN_8;
        if(my_value(row_no,Screen8OkSelected))
        {
                set_flag_value(row_no,OPEN,FALSE);
                set_flag_value(row_no,COMPLETED,TRUE);
                send_UI_message(Screen8Close);
                send_UI_message(EndFlow);
                /* Transaction complete , shut down */
        }
        return TRUE;
}
/*- - - - - - - - - - - - - - - - - - - -[ matrix_fns.c
]- - - - - - - - - - - - - - - - - - - -*/
```

Figure 12:
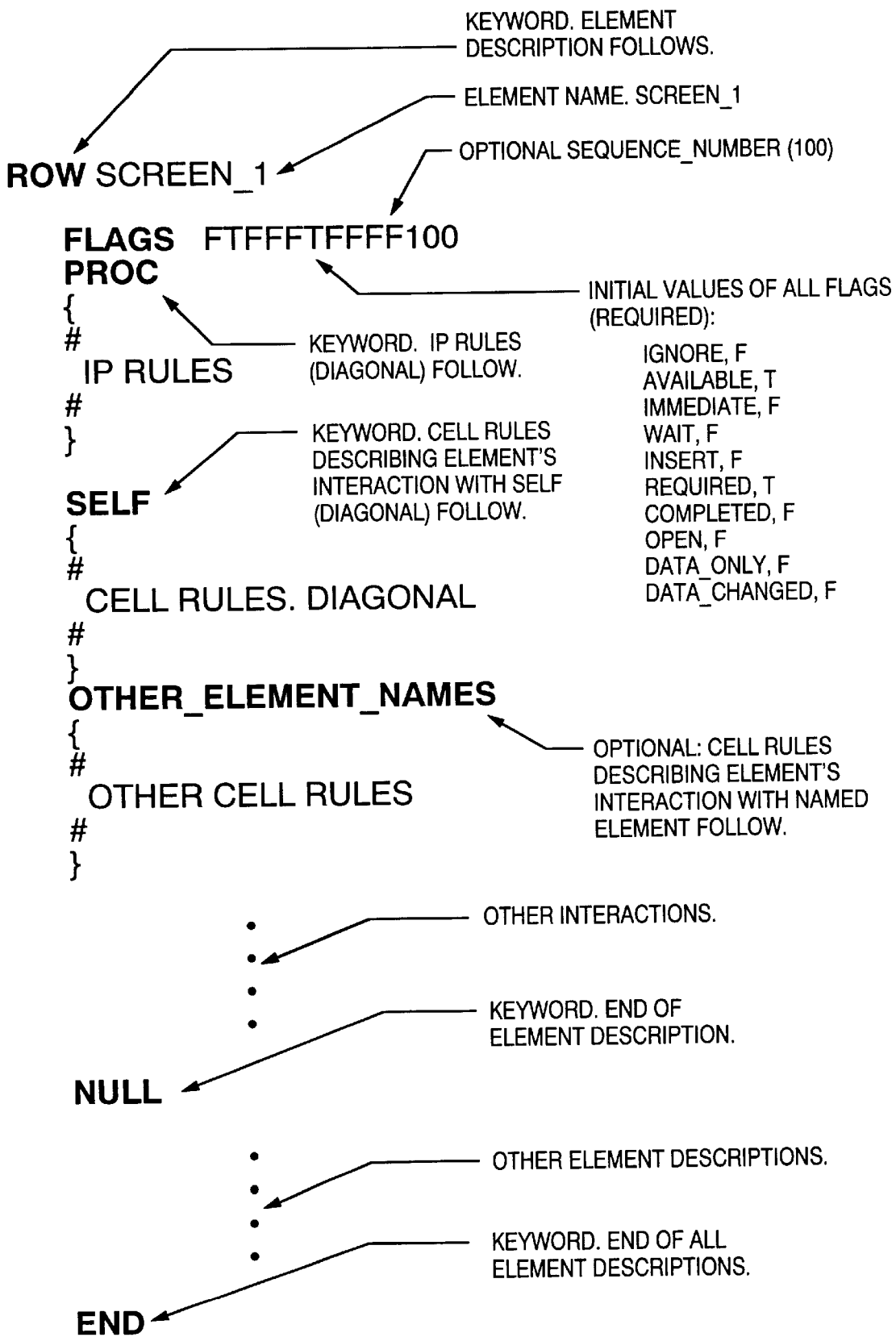
FIG. 12 schematically illustrates the MAP language description of matrix elements, including the structure of the language and the keywords recognized by MAP, as well as their meaning.

The first element described in this file is Screen_1. It is used as an example to illustrate basic behaviors. The basic structure and keywords of an element description are illustrated in FIG. 12, which uses Screen_1 as an example. The keywords ROW, FLAGS, PROC, SELF and NULL must appear. ROW is followed by the element's name, SCREEN_1 in this case. FLAGS is followed by a list of the flag's initial values in the order shown. All rule sets are preceded by the characters "{" and "#". Rule sets are ended with "#" and followed by "}". The keyword PROC precedes the IP rules and the keyword SELF designates that cell rules on the diagonal cell follow (i.e. the element's influence on itself). All other cell rules (if they exist) are preceded by the name of the element which they influence. The keyword NULL ends the element description and the keyword END designates the end of all element descriptions for the entire matrix. Within the description of an element, the term "row_no" is a shorthand substitute for the element name.

TABLE I illustrates the various behaviors of Screen_1 and its impact on other elements. The IP rules send a message to the UI to display the screen and set its OPEN flag to TRUE. Messages are identified by a noun-verb pair such as Screen1Display. Recall that the IP rules are fired when the SCREEN_1 element (Screen_1) is discovered to be the active element by the Matrix Scan Rules. So, when SCREEN_1 becomes active (by MSR_3 in this case because it is the first required screen), Screen_1 is displayed. This is the first thing which happens in the transactional flow.

The next events are the result of the user pressing buttons on Screen_1 and the actions associated with these events are expressed in the cell rules. The cell rules shown under SELF (the diagonal cell rules or the element's influence on itself) indicate that if the user presses the Ok button, a message is sent to the UI to close Screen_1. Also, the OPEN flag is set FALSE and the COMPLETED flag is set TRUE. The impact of this latter action is that the Matrix Scan rules will no longer find the SCREEN element, i.e., Screen_1 is completed. All things being equal, the Matrix Scan Rules will find the next required screen in the flow (via MSR_3) which is Screen_5 in this example.

If the user presses the S2 button (FIG. 3), the UI sends a message from its button callback routine to NAV. The message content (Screen2Selected) is loaded into element SCREEN_1's data value switching its DATA_CHANGED flag to TRUE. Following the Navigational Algorithm, Resolve Rules is executed next and the element's entire row is checked for cell rules which can fire (running the row). The cell rule which influences the SCREEN_2 row is activated which turns on the IMMEDIATE flag for the element SCREEN_2. This action sets the stage for the Matrix Scan Rules which are run next. In this case, MSR_1 finds SCREEN_2 and fires its IP rules.

The ultimate effect of all this is that Screen_2 appears along with Screen_1 as desired. The code for Screen_2 appears in TABLE II. When the user presses the Screen_2 "Ok" button, the Screen2OkSelected message is received by NAV which fires the SELF rule for Screen_2 closing the screen and toggling the OPEN flag to FALSE. NAV also sends a message to the UI to close Screen_2 leaving Screen_1 still open. MSR_2 will continually find the SCREEN_1 element (because it is open and not completed) until the user presses the Screen_1 Ok button.

If the user presses the S3 button while Screen_2 is displayed, Screen_3 appears via the same mechanism that brought up Screen_2. The result would be all three screens displayed simultaneously.

Once the user presses the Ok button on Screen_1, the SELF rules are fired closing the screen, setting its COMPLETED flag to TRUE and setting its OPEN flag to FALSE. Now MSR_3 finds Screen_5 as the next required screen and its IP rules take care of displaying it and setting appropriate flags.

If the user presses either the S6 or S7 button on Screen_5, its SELF rules take care of closing the screen and setting appropriate flags. In addition to SELF rules, the SCREEN_5 element has interactions with the SCREEN_6 and SCREEN_7 elements. Only one of these rules fires depending on which button was pressed by the user in Screen_5. For example, if the user pressed the S7 button, the cell rule for the interaction of element SCREEN_5 with SCREEN_7 would fire setting the SCREEN7.AVAILABLE flag to TRUE.

Now, when the MSRs search for the next active element, MSR 3 will find SCREEN_7 because it meets all of the necessary conditions. Both SCREEN_6 and SCREEN_7 are started with their REQUIRED flags set to TRUE and their AVAILABLE flags set to FALSE. The latter condition keeps either of them from becoming the active element until the cell rule (interaction of SCREEN_5 with SCREEN_7) sets the appropriate AVAILABLE flag.

After the user presses the Ok button on Screen_7, Screen_8 appears and the flow finally ends as this screen is closed. The SCREEN_8 element SELF rule sends a special message to the UI indicating that the transaction is over—send_UI_Message(EndFlow). The rules encountered thus far and through the rest of this matrix in TABLE I indicate some obvious patterns, for example:

IP rules generally display the element's associated screen;

At least one rule is required for every message from the UI;

Required screens are numbered in their preferred order of appearance so that MSR_3 finds them in that order. Conversely, changing an element's sequence number relative to that of other elements changes its order of appearance. This feature along with the IGNORE flag can be used to great advantage to allow local user customization.

Non-Required screens are made accessible (capable of being found) to the MSRs using the IMMEDIATE flag.

Choice points (e.g., Screen_5 to either Screen_6 or Screen_7) can readily be handled as shown above, but can also be handled using other flags such as the INSERT flag.

Further inspection of the foregoing example illustrates how the Navigational Algorithm works with the Matrix Scan Rules and Resolve Rules to achieve the desired navigational capability, and how knowledge of all three of these algorithms is essential to correctly write IP and cell rules.

B. Complex Navigation

Figure 13:
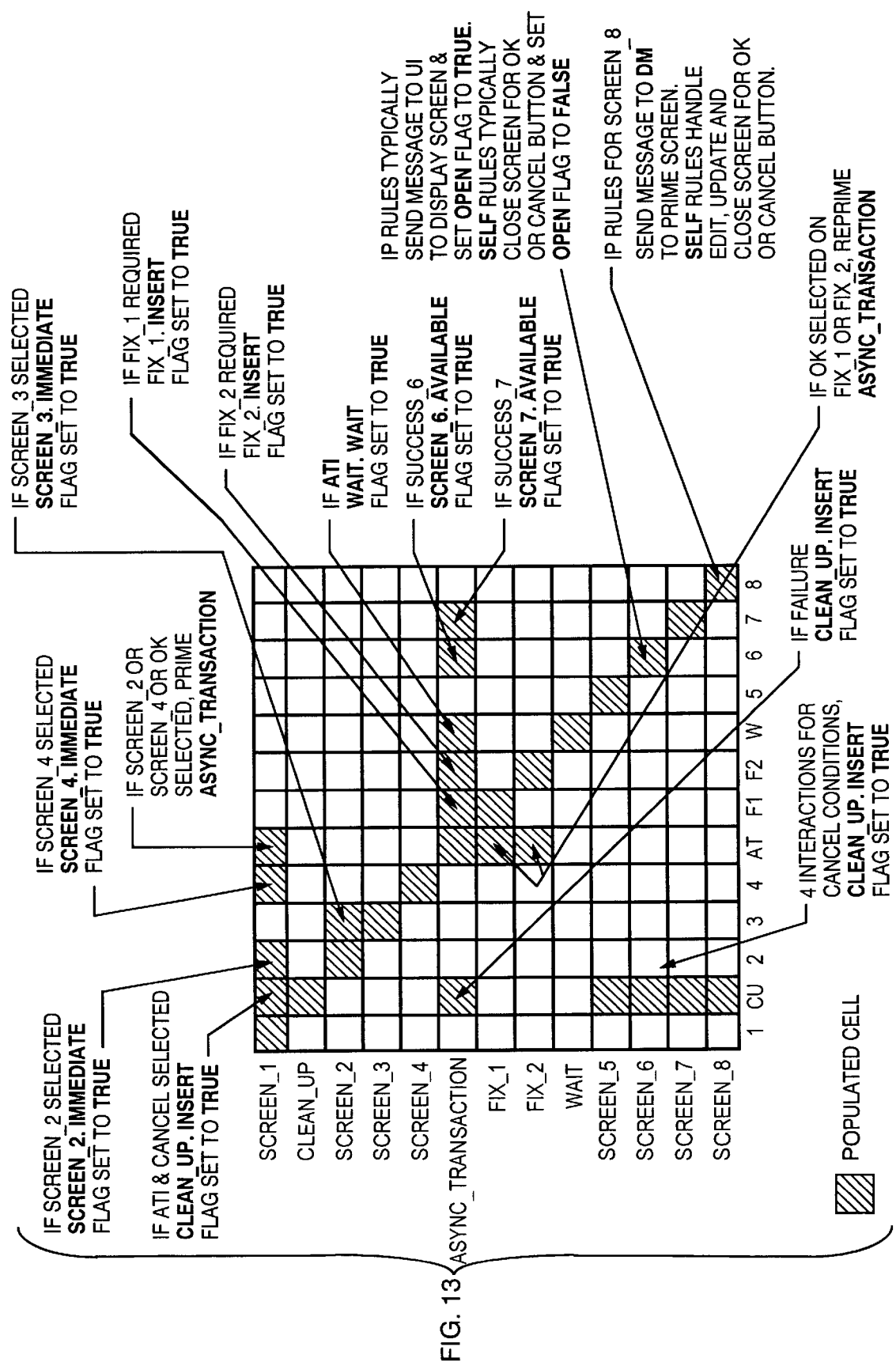
FIG. 13 pictorially illustrates the interactions and cell rules for a complex navigational case.

Interactions for the complex navigation example are shown in FIG. 13. The code describing the IP rules and cell rules is shown in the following TABLE III. Subsequent TABLE IV contains the associated C functions for IP and cell rules after translation by MAP. As previously indicated, this example includes thirteen elements, one for each screen in the flow and one additional element for the status of Async_Transaction flow.

TABLE III

MATRIX DESCRIPTION CODE FOR COMPLEX TRANSACTIONAL FLOW

```
/*
/*
    FLAGS
    TFFFFFFFFF       IGNORE
    FTFFFFFFFF       AVAILABLE
    FFTFFFFFFF       IMMEDIATE
    FFFTFFFFFF       WAIT
    FFFFTFFFFF       INSERT
    FFFFFTFFFF       REQUIRED
    FFFFFFTFFF       COMPLETED
    FFFFFFFTFF       OPEN
    FFFFFFFFTF       DATA_ONLY
    FFFFFFFFFT       DATA_CHANGED
    FFFFFFFFFF100    SEQ_NO = 100
*/
/*
int send_UI_message( int msg_id );
int send_EDITOR_message( int row_no, int msg_id );
int send_DM_message( int row_no, int msg_id );
int send_ASYNC_TRANSACTION_message( int row_no,
int msg_id );
*/
```

TABLE III-continued

MATRIX DESCRIPTION CODE FOR COMPLEX TRANSACTIONAL FLOW

```
/*
13 Elements with Rows:
SCREEN_1
CLEAN_UP
SCREEN_2
SCREEN_3
SCREEN_4
ASYNC_TRANSACTION
FIX_1
FIX_2
WAIT
SCREEN_5
SCREEN_6
SCREEN_7
SCREEN_8
*/
/*
INCLUDE example_msg.h
INCLUDE cmss_structs.h
INCLUDE NSI_Res_test_Global_Messages.h
FLOW example_complex_flow
*/
ROW
SCREEN_1
    FLAGS FTFFFTFFFF100
    PROC
    {
    #
        row_no.OPEN = TRUE;
        send_UI_message(Screen1Display);
    #
    }
    SELF
    {
    #
        if(row_no.VALUE == Screen1CancelSelected)
        {
            row_no.OPEN = FALSE;
            row_no.COMPLETED = TRUE;
            send_UI_message(Screen1Close);
            send_UI_message(EndFlow);        /* shut down */
        }
        if(row_no.VALUE == Screen1OkSelected)
        {
            row_no.OPEN = FALSE;
            row_no.COMPLETED = TRUE;
            send_UI_message(Screen1Close);
        }
    #
    }
    SCREEN_2
    {
    #
        if(row_no.VALUE == Screen2Selected)
        {
            SCREEN_2.IMMEDIATE = TRUE;
        }
    #
    }
    SCREEN_4
    {
    #
        if(row_no.VALUE == Screen4Selected)
        {
            SCREEN_4.IMMEDIATE = TRUE;
        }
    #
    }
    ASYNC_TRANSACTION
    {
    #
        if( ( (row_no.VALUE == Screen1OkSelected) ||   /* User presses S1, S2 or S4 buttons and    */
              (row_no.VALUE == Screen2Selected) ||
              (row_no.VALUE == Screen4Selected) ) &&
            (ASYNC_TRANSACTION.VALUE == NIL) )   /* have
```

TABLE III-continued

MATRIX DESCRIPTION CODE FOR COMPLEX TRANSACTIONAL FLOW

```
not started Async Transaction,    */
        {
            (ASYNC_TRANSACTION.VALUE = SEND;    /* then get it ready to go */
        }
    #
    }
    CLEAN_UP
    {
    #
        if( (row_no.VALUE == Screen1CancelSelected) &&   /* User cancels, Async Transaction started */
            (ASYNC_TRANSACTION.VALUE != NIL) )
        {
            CLEAN_UP.INSERT = TRUE;        /* then bring in Cleanup */
        }
    #
    }
NULL
ROW
CLEAN_UP
    FLAGS FTFFFFFFFF200
    PROC
    {
    #
        row_no.INSERT = FALSE;
        row_no.OPEN = TRUE;
        send_UI_message(CleanupDisplay);
    #
    }
    SELF
    {
    #
        if (row_no.VALUE == CleanupOkSelected)
        {
            row_no.OPEN = FALSE;
            row_no.COMPLETED = TRUE;
            send_UI_message(CleanupClose);
            send_UI_message(EndFlow);        /* shut down */
        }
    #
    }
NULL
ROW
SCREEN_2
    FLAGS FTFFFFFFFF
    Proc
    {
    #
        row_no.IMMEDIATE = FALSE;
        row_no.OPEN = TRUE;
        send_UI_message(Screen2Display);
    #
    }
    SELF
    {
    #
        if(row_no.VALUE == Screen2OkSelected)
        {
            row_no.OPEN = FALSE;
            row_no.COMPLETED = TRUE;
            send_UI_message(Screen2Close);
        }
    #
    }
    SCREEN_3
    {
    #
        if(row_no.VALUE == Screen3Selected)
        {
            SCREEN_3.IMMEDIATE = TRUE;
        }
    #
    }
NULL
```

TABLE III-continued

MATRIX DESCRIPTION CODE FOR COMPLEX TRANSACTIONAL FLOW

```
ROW
SCREEN_3
    FLAGS FTFFFFFFFF
    PROC
    {
    #
        row_no.IMMEDIATE = FALSE;
        row_no.OPEN = TRUE;
        send_UI_message(Screen3Display);
    #
    }
    SELF
    {
    #
        if(row_no.VALUE == Screen3OkSelected)
        {
            row_no.OPEN = FALSE;
            row_no.COMPLETED = TRUE;
            send_UI_message(Screen3Close);
        }
    #
    }
NULL
ROW
SCREEN_4
    FLAGS FTFFFFFFFF
    PROC
    {
    #
        row_no.IMMEDIATE = FALSE;
        row_no.OPEN = TRUE;
        send_UI_message(Screen4Display);
    #
    }
    SELF
    {
    #
        if(row_no.VALUE == Screen4OkSelected)
        {
            row_no.OPEN = FALSE;
            row_no.COMPLETED = TRUE;
            send_UI_message(Screen4Close);
        }
    #
    }
NULL
ROW
ASYNC_TRANSACTION       /* DATA_ONLY element */
    FLAGS FTFFFFFFTF
    PROC        /* no processing */
    {
    }
    SELF
    {
    #
        if(row_no.VALUE == SEND)    /* need to start Async
Transaction */
        {
            send_ASYNC_TRANSACTION_message(row_no,
AsyncTransactionBegin);
            row_no.VALUE = SENT;
        }
    #
    }
    WAIT
    {
    #
        if(  (row_no.VALUE == SEND) ||
             (row_no.VALUE == SENT) )   /* i.e. still out there with
Transaction */
        {
            WAIT.WAIT = TRUE;
        }
        else if(  (row_no.VALUE == Fix1Required) ||   /* i.e.
anything back */
                  (row_no.VALUE == Fix2Required) ||
```

TABLE III-continued

MATRIX DESCRIPTION CODE FOR COMPLEX TRANSACTIONAL FLOW

```
                  (row_no.VALUE == Success6) ||
                  (row_no.VALUE == Success7) ||
                  (row_no.VALUE == Failure) )
        {
            WAIT.VALUE = KILL;
        }
    #
    }
SCREEN_6
    {
    #
        if(row_no.VALUE == Success6)
        {
            SCREEN_6.AVAILABLE = TRUE;
        }
    #
    }
SCREEN_7
    {
    #
        if(row_no.VALUE == Success7)
        {
            SCREEN_7.AVAILABLE = TRUE;
        }
    #
    }
FIX_1
    {
    #
        if(row_no.VALUE == Fix1Required)
        {
            FIX_1.INSERT = TRUE;
        }
    #
    }
FIX_2
    {
    #
        if(row_no.VALUE == Fix2Required)
        {
            FIX_2.INSERT = TRUE;
        }
    #
    }
CLEAN_UP
    {
    #
        if(row_no.VALUE == Failure)
        {
            CLEAN_UP.INSERT = TRUE;
        }
    #
    }
NULL
ROW
FIX_1
    FLAGS FTFFFFFFFF300
    PROC
    {
    #
        row_no.INSERT = FALSE;
        row_no.OPEN = TRUE;
        send_UI_message(Fix1Display);
    #
    }
    SELF
    {
    #
        if(row_no.VALUE == Fix1OkSelected)
        {
            row_no.OPEN = FALSE;
            send_UI_message(Fix1Close);
        }
    #
    }
ASYNC_TRANSACTION
```

TABLE III-continued

MATRIX DESCRIPTION CODE FOR COMPLEX TRANSACTIONAL FLOW

```
    {
    #
        if(row_no.VALUE == Fix1OkSelected)         /* User
presses Ok button */
        {
            ASYNC_TRANSACTION.VALUE = SEND;    /* then get
it ready to go again */
        }
    #
    }
NULL
ROW
FIX_2
    FLAGS FTFFFFFFFF400
    PROC
    {
    #
        row_no.INSERT = FALSE;
        row_no.OPEN = TRUE;
        send_UI_message(Fix2Display);
    #
    }
    SELF
    {
    #
        if(row_no.VALUE == Fix2OkSelected)
        {
            row_no.OPEN = FALSE;
            send_UI_message(Fix2Close);
        }
    #
    }
    ASYNC_TRANSACTION
    {
    #
        if(row_no.VALUE == Fix2OkSelected)         /* User
presses Ok button */
        {
            ASYNC_TRANSACTION.VALUE = SEND;    /* then get
it ready to go again */
        }
    #
    }
NULL
ROW
WAIT
    FLAGS FTFFFFFFFF1200
    PROC
    {
    #
        row_no.OPEN = TRUE;
        send_UI_message(WaitDisplay);
    #
    }
    SELF
    {
    #
        if(row_no.VALUE == KILL)
        {
            row_no.WAIT = FALSE;
            if(row_no.OPEN == TRUE)
            {
                row_no.OPEN = FALSE;
                send_UI_message(WaitClose);
            }
        }
    #
    }
NULL
/* Screen_5 is first required screen available after
Async_Transaction is complete */
ROW
SCREEN_5
    FLAGS FTFFFTFFFF1300
    PROC
    {
```

TABLE III-continued

MATRIX DESCRIPTION CODE FOR COMPLEX TRANSACTIONAL FLOW

```
    #
        row_no.OPEN = TRUE;
        send_UI_message(Screen5Display);
    #
    }
    SELF
    {
    #
        if(row_no.VALUE == Screen5CancelSelected)
        {
            row_no.OPEN = FALSE;
            send_UI_message(Screen5Close);
        }
        if(row_no.VALUE == Screen5OkSelected)
        {
            row_no.OPEN = FALSE;
            row_no.COMPLETED = TRUE;
            send_UI_message(Screen5Close);
        }
    #
    }
    CLEAN_UP
    {
    #
        if(  (row_no.VALUE == Screen5CancelSelected) &&
             (ASYNC_TRANSACTION.VALUE != NIL) )
        {
            CLEAN_UP.INSERT = TRUE;
        }
    #
    }
NULL
/* Screens 6 & 7 are REQUIRED but start with AVAILABLE flag =
FALSE */
ROW
SCREEN_6
    FLAGS FFFFFTFFFF1350
    PROC
    {
    #
        row_no.OPEN = TRUE;
        send_UI_message(Screen6Display);
    #
    }
    SELF
    {
    #
        if(row_no.VALUE == Screen6CancelSelected)
        {
            row_no.OPEN = FALSE;
            send_UI_message(Screen6Close);
        }
        if(row_no.VALUE == Screen6OkSelected)
        {
            row_no.OPEN = FALSE;
            row_no.COMPLETED = TRUE;
            send_UI_message(Screen6Close);
        }
    #
    }
    CLEAN_UP
    {
    #
        if(  (row_no.VALUE == Screen6CancelSelected) &&
             (ASYNC_TRANSACTION.VALUE != NIL) )
        {
            CLEAN_UP.INSERT = TRUE;
        }
    #
    }
NULL
ROW
SCREEN_7
    FLAGS FFFFFTFFFF1375
    PROC
    {
```

TABLE III-continued

MATRIX DESCRIPTION CODE FOR COMPLEX TRANSACTIONAL FLOW

```
    #
        row_no.OPEN = TRUE;
        send_UI_message(ScreenDisplay);
    #
    }
SELF
{
    #
        if(row_no.VALUE == Screen7CancelSelected)
        {
            row_no.OPEN = FALSE;
            send_UI_message(Screen7Close);
        }
        if(row_no.VALUE == Screen7OkSelected)
        {
            row_no.OPEN = FALSE;
            row_no.COMPLETED = TRUE;
            send_UI_message(Screen7Close);
        }
    #
}
CLEAN_UP
{
    #
        if(  (row_no.VALUE == Screen7CancelSelected) &&
             (ASYNC_TRANSACTION.VALUE != NIL) )
        {
            CLEAN_UP.INSERT = TRUE;
        }
    #
}
NULL
/* Screen 8 needs to be primed, edited and a database update is
required */
ROW
SCREEN_8
    FLAGS FTFFFTFFFF1400
    PROC
    {
        #
            row_no.OPEN = TRUE;
            send_DM_message(Screen8Prime);
        #
    }
    SELF
    {
        #
            if(row_no.VALUE == Screen8Primed)
            {
                send_UI_message(Screen8Display);
            }
            if(row_no.VALUE == Screen8CancelSelected)
            {
                row_no.OPEN = FALSE;
                send_UI_message(Screen8Close);
            }
            if(row_no.VALUE == Screen8OkSelected)
            {
                send_EDITOR_message(row_no, Screen8Edit);
            }
            if(row_no.VALUE == Screen8Edited)
            {
                send_DM_message(row_no, Screen8Update);
            }
            if(row_no.VALUE == Screen8Updated)
            {
                row_no.OPEN = FALSE;
                row_no.COMPLETED = TRUE;
                send_UI_message(Screen8Close);
                send_UI_message(EndFlow);   /* Transaction complete,
shut down */
            }
        #
    }
    CLEAN_UP
    {
```

TABLE III-continued

MATRIX DESCRIPTION CODE FOR COMPLEX TRANSACTIONAL FLOW

```
    #
        if(  (row_no.VALUE == Screen8CancelSelected) &&
             (ASYNC_TRANSACTION.VALUE != NIL) )
        {
            CLEAN_UP.INSERT = TRUE;
        }
    #
    }
NULL
END
```

TABLE IV

C CODE FROM MAP - COMPLEX TRANSACTIONAL FLOW

```
/*
 *
 */
/*
 *
 *
 *
 */
#include <stdio.h>
#include <string.h>
#include "nav_constants.h"
#include "navigator.h"
#include "JFMM_row.h"
#include "message.h"
#include "msg_constants.h"
#include "JFMM_std_data_msg.h"
extern int  send_UI_message( );       /* matrix_util.c */
extern int  send_flag_value( );       /* matrix_util.c */
extern int  set_data_value( );        /* matrix_util.c */
extern int  set_global( );            /* matrix_util.c */
extern int  my_value( );              /* matrix_util.c */
extern int  my_global( );             /* matrix_util.c */
extern int  my_flag( );               /* matrix_util.c */
extern MATRIX matrix;
/*- - - - - - - - - - - - - - - - - - - - -[ PROCESSING
]- - - - - - - - - - - - - - - - - - - - - */
int
SCREEN_1_proc( )
{
    char  row_no = SCREEN_1;
    set_flag_value(row_no,OPEN,TRUE);
        send_UI_message(Screen1Display);
        return TRUE;
}
int
CLEAN_UP_proc( )
{
    char  row_no = CLEAN_UP;
    set_flag_value(row_no,INSERT,FALSE);
        set_flag_value(row_no,OPEN,TRUE);
        send_UI_message(CleanupDisplay);
        return TRUE;
}
int
SCREEN_2_proc( )
{
    char  row_no = SCREEN_2;
    set_flag_value(row_no,IMMEDIATE,FALSE);
        set_flag_value(row_no,OPEN,TRUE);
        send_UI_message(Screen2Display);
        return TRUE;
}
int
SCREEN_3_proc( )
{
    char  row_no = SCREEN_3;
    set_flag_value(row_no,IMMEDIATE,FALSE);
        set_flag_value(row_no,OPEN,TRUE);
```

TABLE IV-continued
C CODE FROM MAP - COMPLEX TRANSACTIONAL FLOW

```
        send_UI_message(Screen3Display);
        return TRUE;
}
int
SCREEN_4_proc( )
{
    char  row_no = SCREEN_4;
    set_flag_value(row_no,IMMEDIATE,FALSE);
    set_flag_value(row_no,OPEN,TRUE);
    send_UI_message(Screen4Display);
    return TRUE;
}
int
ASYNC_TRANSACTION_proc( )
{
    char  row_no = ASYNC_TRANSACTION;
    return TRUE;
}
int
FIX_1_proc( )
{
    char  row_no = FIX_1;
    set_flag_value(row_no,INSERT,FALSE);
        set_flag_value(row_no,OPEN,TRUE);
        send_UI_message(Fix1Display);
    return TRUE;
}
int
FIX_2_proc( )
{
    char  row_no = FIX_2;
    set_flag_value(row_no,INSERT,FALSE);
        set_flag_value(row_no,OPEN,TRUE);
        send_UI_message(Fix2Display);
    return TRUE;
}
int
WAIT_proc( )
{
    char  row_no = WAIT;
    set_flag_value(row_no,OPEN,TRUE);
        send_UI_message(WaitDisplay);
    return TRUE;
}
int
SCREEN_5_proc( )
{
    char  row_no = SCREEN_5;
    set_flag_value(row_no,OPEN,TRUE);
        send_UI_message(Screen5Display);
    return TRUE;
}
int
SCREEN_6_proc( )
{
    char  row_no = SCREEN_6;
    set_flag_value(row_no,OPEN,TRUE);
        send_UI_message(Screen6Display);
    return TRUE;
}
int
SCREEN_7_proc( )
{
    char  row_no = SCREEN_7;
    set_flag_value(row_no,OPEN,TRUE);
        send_UI_message(Screen7Display);
    return TRUE;
}
int
SCREEN_8_proc( )
{
    char  row_no = SCREEN_8;
    set_flag_value(row_no,OPEN,TRUE);
        send_DM_message(Screen8Prime);
    return TRUE;
}
/*- - - - - - - - - - - - - - - - - - - - [ INTERACTIONS
```

TABLE IV-continued
C CODE FROM MAP - COMPLEX TRANSACTIONAL FLOW

```
]- - - - - - - - - - - - - - - - - - - - */
int
SCREEN_1_SCREEN_1_inter( )
{
    char  row_no = SCREEN_1;
    if(my_value(row_no,Screen1CancelSelected))
    {
        set_flag_value(row_no,OPEN,FALSE);
        set_flag_value(row,no,COMPLETED,TRUE);
        send_UI_message(Screen1Close);
        send.UI_message(EndFlow);
        /* shut down */
    }
    if(my_value(row_no,Screen1OkSelected))
    {
        set_flag_value(row_no,OPEN,FALSE);
        set_flag_value(row_no,COMPLETED,TRUE);
        send_UI_message(Screen1Close);
    }
    return TRUE;
}
int
SCREEN_1_SCREEN_2_inter( )
{
    char  row_no = SCREEN_1;
    if(my_value(row_no,Screen2Selected))
    {
        set_flag_value(SCREEN_2,IMMEDIATE,TRUE);
    }
    return TRUE;
}
int
SCREEN_1_SCREEN_4_inter( )
{
    char  row_no = SCREEN_1;
    if(my_value(row_no,Screen4Selected))
    {
        set_flag_value(SCREEN_4,IMMEDIATE,TRUE);
    }
    return TRUE;
}
int
SCREEN_1_ASYNC_TRANSACTION_inter( )
{
    char  row_no = SCREEN_1;
    if( ( (my_value(row_no,Screen1OkSelected)) || /* User presses
S1 , S2 or S4 buttons and */   (my_value(row_no,Screen2Selected)) ||
(my_value(row_no,Screen4Selected)) ) &&
(my_value(ASYNC_TRANSACTION,NIL)) ) /* have not started
Async Transaction , */
    {
        set_data_value(ASYNC_TRANSACTION,SEND);
        /* then get it ready to go */
    }
    return TRUE;
}
int
SCREEN_1_CLEAN_UP_inter( )
{
    char  row_no = SCREEN_1;
    if( (my_value(row_no,Screen1CancelSelected)) && /* User
cancels Async Transaction started */   (!my_value
(ASYNC_TRANSACTION,NIL)) )
    {
        set_flag_value(CLEAN_UP,INSERT,TRUE);
        /* then bring in Cleanup */
    }
    return TRUE;
}
int
CLEAN_UP_CLEAN_UP_inter( )
{
    char  row_no = CLEAN_UP;
    if(my_value(row_no,CleanupOkSelected))
    {
        set_flag_value(row_no,OPEN,FALSE);
        set_flag_value(row_no,COMPLETED,TRUE);
```

TABLE IV-continued

C CODE FROM MAP - COMPLEX TRANSACTIONAL FLOW

```
            send_UI_message(CleanupClose);
            send_UI_message(EndFlow);
            /* shut down */
        }
        return TRUE;
}
int
SCREEN_2_SCREEN_2_inter( )
{
        char    row_no = SCREEN_2;
        if(my_value(row_no,Screen2OkSelected))
        {
            set_flag_value(row_no,OPEN,FALSE);
            set_flag_value(row_no,COMPLETED,TRUE);
            send_UI_message(Screen2Close);
        }
        return TRUE;
}
int
SCREEN_2_SCREEN_3_inter( )
{
        char    row_no = SCREEN_2;
        if(my_value(row_no,Screen3Selected))
        {
            set_flag_value(SCREEN_3,IMMEDIATE,TRUE);
        }
        return TRUE;
}
int
SCREEN_3_SCREEN_3_inter( )
{
        char    row_no = SCREEN_3;
        if(my_value(row_no,Screen3OkSelected))
        {
            set_flag_value(row_no,OPEN,FALSE);
            set_flag_value(row_no,COMPLETED,TRUE);
            send_UI_message(Screen3Close);
        }
        return TRUE;
}
int
SCREEN_4_SCREEN_4_inter( )
{
        char    row_no = SCREEN_4;
        if(my_value(row_no,Screen4OkSelected))
        {
            set_flag_value(row_no,OPEN,FALSE);
            set_flag_value(row_no,COMPLETED,TRUE);
            send_UI_message(Screen4Close);
        }
        return TRUE;
}
int
ASYNC_TRANSACTION_ASYNC_TRANSACTION_inter( )
{
        char    row_no = ASYNC_TRANSACTION;
        if(my_value(row_no,SEND)) /* need to start Async Transaction */
        {
            send_ASYNC_TRANSACTION_message(row_no,
AsyncTransactionBegin);
            set_data_value(row_no,SENT);
        }
        return TRUE;
}
int
ASYNC_TRANSACTION_WAIT_inter( )
{
        char    row_no = ASYNC_TRANSACTION;
        if( (my_value(row_no,SEND)) || (my_value(row_no,SENT)) ) /*
i.e. still out there with Transaction */
        {
            set_flag_value(WAIT,WAIT,TRUE);
        }
        else if( (my_value(row_no,Fix1Required)) || /* i.e. anything
back */ (my_value(row_no,Fix2Required)) ||
(my_value(row_no,Success6)) || (my_value(row_no,Successs7)) ||
(my_value(row_no,Failure)) )
        {
            set_data_value(WAIT,KILL);
        }
        return TRUE;
}
int
ASYNC_TRANSACTION_SCREEN_6_inter( )
{
        char    row_no = ASYNC_TRANSACTION;
        if(my_value(row_no,Success6))
        {
            set_flag_value(SCREEN_6,AVAILABLE,TRUE);
        }
        return TRUE;
}
int
ASYNC_TRANSACTION_SCREEN_7_inter( )
{
        char    row_no = ASYNC_TRANSACTION;
        if(my_value(row_no,Successs7))
        {
            set_flag_value(SCREEN_7,AVAILABLE,TRUE);
        }
        return TRUE
}
int
ASYNC_TRANSACTION_FIX_1_inter( )
{
        char    row_no = ASYNC_TRANSACTION;
        if(my_value(row_no,Fix1Required))
        {
            set_flag_value(FIX_1,INSERT,TRUE);
        }
        return TRUE;
}
int
ASYNC_TRANSACTION_FIX_2_inter( )
{
        char    row_no = ASYNC_TRANSACTION;
        if(my_value(row_no,Fix2Required))
        {
            set_flag_value(FIX_2,INSERT,TRUE);
        }
        return TRUE;
}
int
ASYNC_TRANSACTION_CLEAN_UP_inter( )
{
        char    row_no = ASYNC_TRANSACTION;
        if(my_value(row_no,Failure))
        {
            set_flag_value(CLEAN_UP,INSERT,TRUE);
        }
        return TRUE;
}
int
FIX_1_FIX_1_inter( )
{
        char    row_no = FIX_1;
        if(my_value(row_no,Fix1OkSelected))
        {
            set_flag_value(row_no,OPEN,FALSE);
            send_UI_message(Fix1Close);
        }
        return TRUE;
}
int
FIX_1_ASYNC_TRANSACTION_inter( )
{
        char    row_no = FIX_1;
        if(my_value(row_no,Fix1OkSelected)) /* User presses Ok button
*/
        {
            set_data_value(ASYNC_TRANSACTION,SEND);
            /* then get it ready to go again */
        }
        return TRUE;
```

TABLE IV-continued

C CODE FROM MAP - COMPLEX TRANSACTIONAL FLOW

```
}
int
FIX_2_FIX_2_inter( )
{
    char  row_no = FIX_2;
    if(my_value(row_no,Fix2OkSelected))
    {
        set_flag_value(row_no,OPEN,FALSE);
        send_UI_message(Fix2Close);
    }
    return TRUE;
}
int
FIX_2_ASYNC_TRANSACTION_inter( )
{
    char  row_no = FIX_2;
    if(my_value(row_no,Fix2OkSelected)) /* User presses Ok button
*/
    {
        set_data_value(ASYNC_TRANSACTION,SEND);
        /* then get it ready to go again */
    }
    return TRUE;
}
int
WAIT_WAIT_inter( )
{
    char  row_no = WAIT;
    if(my_value(row_no,KILL))
    {
        set_flag_value(row_no,WAIT,FALSE);
        if(my_flag(row_no,OPEN) == TRUE)
        {
            set_flag_value(row_no,OPEN,FALSE);
            send_UI_message(WaitClose);
        }
    }
    return TRUE;
}
int
SCREEN_5_SCREEN_5_inter( )
{
    char  row_no = SCREEN_5;
    if(my_value(row_no,Screen5CancelSelected))
    {
        set_flag_value(row_no,OPEN,FALSE);
        send_UI_message(Screen5Close);
    }
    if(my_value(row_no,Screen5OkSelected))
    {
        set_flag_value(row_no,OPEN,FALSE);
        set_flag_value(row_no,COMPLETED,TRUE);
        send_UI_message(Screen5Close);
    }
    return TRUE;
}
int
SCREEN_5_CLEAN_UP_inter( )
{
    char  row_no = SCREEN_5;
    if( (my_value(row_no,Screen5CancelSelected)) &&
(!my_value(ASYNC_TRANSACTION,NIL)) )
    {
        set_flag_value(CLEAN_UP,INSERT,TRUE);
    }
    return TRUE;
}
int
SCREEN_6_SCREEN_6_inter( )
{
    char  row_no = SCREEN_6;
    if(my_value(row_no,Screen6CancelSelected))
    {
        set_flag_value(row_no,OPEN,FALSE);
        send_UI_message(Screen6Close);
    }
    if(my_value(row_no,Screen6OkSelected))
```

TABLE IV-continued

C CODE FROM MAP - COMPLEX TRANSACTIONAL FLOW

```
    {
        set_flag_value(row_no,OPEN,FALSE);
        set_flag_value(row_no,COMPLETED,TRUE);
        send_UI_message(Screen6Close);
    }
    return TRUE;
}
int
SCREEN_6_CLEAN_UP_inter( )
{
    char  row_no = SCREEN_6;
    if( (my_value(row_no,Screen6CancelSelected)) &&
(!my_value(ASYNC_TRANSACTION,NIL)) )
    {
        set_flag_value(CLEAN_UP,INSERT,TRUE);
    }
    return TRUE;
}
int
SCREEN_7_SCREEN_7_inter( )
{
    char  row_no = SCREEN_7;
    if(my_value(row_no,Screen7CancelSelected))
    {
        set_flag_value(row_no,OPEN,FALSE);
        send_UI_message(Screen7Close);
    }
    if(my_value(row_no,Screen7OkSelected))
    {
        set_flag_value(row_no,OPEN,FALSE);
        set_flag_value(row_no,COMPLETED,TRUE);
        send_UI_message(Screen7Close);
    }
    return TRUE;
}
int
SCREEN_7_CLEAN_UP_inter( )
{
    char  row_no = SCREEN_7;
    if( (my_value(row_no,Screen7CancelSelected)) &&
(!my_value(ASYNC_TRANSACTION,NIL)) )
    {
        set_flag_value(CLEAN_UP,INSERT,TRUE);
    }
    return TRUE;
}
int
SCREEN_8_SCREEN_8_inter( )
{
    char  row_no = SCREEN_8;
    if(my_value(row_no,Screen8Primed))
    {
        send_UI_message(Screen8Display);
    }
    -if(my_value(row_no,Screen8CancelSelected))
    {
        set_flag_value(row_no,OPEN,FALSE);
        send_UI_message(Screen8Close);
    }
    if(my_value((row_no,Screen8OkSelected))
    {
        send_EDITOR_message(row_no, Screen8Edit);
    }
    if(my_value(row_no,Screen8Edited))
    {
        send_DM_message(row_no, Screen8Update);
    }
    if(my_value(row_no,Screen8Updated))
    {
        set_flag_value(row_no,OPEN,FALSE);
        set_flag_value(row_no,COMPLETED,TRUE);
        send_UI_message(Screen8Close);
        send_UI_message(EndFlow);
        /* Transaction complete , shut down */
    }
    return TRUE;
}
```

TABLE IV-continued

C CODE FROM MAP - COMPLEX TRANSACTIONAL FLOW

```
int
SCREEN_8_CLEAN_UP_inter( )
{
    char  row_no = SCREEN_8;
    if( (my_value(row_no,Screen8CancelSelected)) &&
(!my_value(ASYNC_TRANSACTION,NIL)) )
    {
        set_flag_value(CLEAN_UP,INSERT,TRUE);
    }
    return TRUE;
}
/*---------------------[ matrix_fns.c
}---------------------*/
```

In order to handle cancellation after the start of Async_Transaction or the failure of Async_Transaction, the Clean Up screen (with corresponding CLEAN_UP element) has been added. This screen is made a candidate for selection by MSR_3 when necessary by setting its INSERT flag to TRUE as shown by a number of the cell rules in FIG. 13. These rules are relatively easy to find because they all lie on the column marked CU. Like SCREEN_8, the CLEAN_UP element uses the EndFlow message to indicate the end of the transaction.

The interactions between a Screen and its child screens are the same as they were in the simple example. In addition, Screen_1 now has an interaction with Async_Transaction which occurs when any of the Screen_1 buttons are pushed and Async_Transaction has not yet been sent (i.e., ASYNC_TRANSACTION.VALUE=NIL). In essence, this action primes Async_Transaction to begin by setting ASYNC_TRANSACTION.VALUE to SEND. This requires the ASYNC_TRANSACTION row to be run, which fires a SELF rule to begin the transaction. In other words, send_ASYNC_TRANSACTION_message(row_no, AsyncTransactionBegin); The same rule sets ASYNC-.TRANSACTION.VALUE to SENT, thus establishing that the transaction has begun. Similarly, results from Async_Transaction fire other interaction rules in the ASYNC_TRANSACTION row to enable Fix_1, Fix_2, Wait and Clean_Up to appear when and if they are necessary. The behavior of these screens is manipulated with their INSERT flags as shown by the appropriate cell rules. The sequence numbers of these screens is chosen to be lower than the first required screen after completion of Async_Transaction so that MSR_3 will find them first as required.

Screens 6 and 7 are enabled with their respective AVAILABLE flags depending on the results of Async_Transaction (Success_6 or Success_7). Screen_5 is found by the MSR_3 as the next required screen in the flow. It is notable that no specific cell rule is necessary to accomplish this action.

Screens Fix_1 and Fix_2 re-initiate Async_Transaction via cell rules which fire after their respective Ok buttons are pressed. This is accomplished in the same way the SCREEN_1 element initiates the transaction. The rule to enable the Wait screen behaves similarly to rules which manipulate the INSERT flags of other elements.

Since Screen_8 is primed from a database, this action occurs via the IP rules, and actual display of the screen is delayed until the screen priming data has been successfully accessed. Thus, in the SELF rules, the rule to display the screen fires upon receipt of the Screen8Primed message from the Data Manipulator (DM). The SELF rules also handle the editing and updating scenarios in a similar manner.

In summary, the present invention is a rule-based system, employed in a client/server environment, for the provision of complex navigational logic which utilizes a Navigation Analysis Vehicle ("NAV") (or Navigational Analysis module) and a Matrix Analysis Package ("MAP"). The MAP facilitates creation of navigation rules for linkage with the rest of the application. In a preferred embodiment of the invention, the NAV communicates navigational instructions to a user interface for the display and the take-down of screens, and also communicates with other processes such as editors and data manipulators. After the navigation rules are created, those rules are then applied to provide navigational logic for the user interface for processing the user interface screens. MAP creates the navigation rules in a user-friendly, C-like language and parses them into ANSI-standard C language for linkage with other processes that control the user interface.

The present invention has been described above with reference to a preferred embodiment. However, those skilled in the art will recognize that changes and modifications may be made in this preferred embodiment without departing from the scope of the present invention. For example, although the exemplary embodiment of NAV relates to the provision of navigational logic for UIs in an X-Windows environment, the technique can be extended to other environments. Further, the technique can handle field-to-field navigation as well as the screen-to-screen navigation disclosed. These and other changes and modifications are intended to be circumscribed by the scope of the present invention. Variations may be made in the construction, arrangement or operation of the elements of the various embodiments as disclosed herein without departing from the spirit and scope of the invention as defined in the following claims.

What is claimed is:

1. In a system for processing an application in a client/server environment, a method of managing presentation of a multiplicity of screen displays at a user interface of a client, said method comprising the steps of:
   receiving at a controller associated with said user interface a first set of messages from said client and one or more processors associated with said controller;
   processing said first set of messages, in accordance with a predetermined set of navigation rules associated with said application, to generate a sequence by which selected ones of said multiplicity of screen displays are to be exhibited at said user interface;
   operating on said first set of messages with a predetermined set of resolve rules;
   executing a set of matrix scan rules on a matrix containing an IGNORE flag, an AVAILABLE flag, or an IMMEDIATE flag, wherein said set of matrix scan rules comprises:
      searching for an element to be immediately executed;
      if an element to be immediately executed is found, terminating execution of the matrix scan rules; if no immediate element is found, identifying a first set of elements and selecting from said first set of elements the element with the lowest sequence number, wherein the sequence number defines the relative order of executing the element;
      searching for an open element, wherein the open element comprises a screen that is currently displayed on a user interface;
      if an open element is found, terminating execution of said matrix scan rules;
      if no open element is found, identifying a second set of elements and selecting from said second set of elements the element with the lowest sequence number;

searching for the next required, waiting, or inserted element; and identifying a third set of elements and selecting from said third set of elements the element with the lowest sequence number;

finding an active element; and if an active element is found, executing said set of resolve rules until a data value associated with an element has not changed, or until a maximum number of iterations allowed in processing said resolve rules has been reached; and communicating a second set of corresponding messages to said client in accordance with said sequence of displaying the selected ones of the multiplicity of screen displays.

2. In a system for procesing an application in a client/server environment, said application comprising a plurality of events with which are associated with a corresponding plurality of messages, a method of managing presentation of a multiplicity of screen displays at a user interface of a client, said method comprising the steps of:

receiving at a controller associated with said user interface a first set of messages from said client and one or more processors associated with said controller;

processing, in turn, each said message in accordance with a predetermined set of navigation rules associated with said application, wherein said set of navigation rules comprises a set of resolve rules and a set of matrix scan rules run on a matrix containing an IGNORE flag, an AVAILABLE flag, an OPEN flag, or a COMPLETED flag, said set of matrix scan rules comprising the steps of:

searching for an element to be immediately executed;

if an immediate element is found, terminating execution of the matrix scan rules;

if no immediate element is found, identifying a first set of elements and selecting from said first set of elements the element with the lowest sequence number, wherein the sequence number defines the relative order of executing the element;

searching for an open element, wherein the open element comprises a screen that is currently displayed on a user interface;

if an open element is found, terminating execution of said matrix scan rules;

if no open element is found, identifying a second set of elements and selecting from said second set of elements the element with the lowest sequence number;

searching for the next required, waiting, or inserted element;

identifying a third set of elements and selecting from said third set of elements the element with the lowest sequence number; and using said set of predetermined navigation rules to establish a sequence by which selected one of said multiplicity of screen displays are to be exhibited at said user interface; and communicating a second set of messages to said client corresponding to said sequence for displaying the selected screen displays.

* * * * *